United States Patent [19]
Takeo et al.

[11] Patent Number: 5,555,737
[45] Date of Patent: Sep. 17, 1996

[54] AIR CONDITIONER CONTROL SYSTEM FOR ELECTRIC VEHICLES

[75] Inventors: Yuji Takeo, Toyoake; Akira Isaji, Nishio; Toshihiro Nagata, Tokoname; Masaya Tanaka; Kunio Iritani, both of Anjo, all of Japan

[73] Assignee: Nippondenso Co., Ltd., Kariya, Japan

[21] Appl. No.: 352,796

[22] Filed: Dec. 1, 1994

[30] Foreign Application Priority Data

Dec. 2, 1993 [JP] Japan .................................. 5-302721
Oct. 19, 1994 [JP] Japan .................................. 6-253188

[51] Int. Cl.⁶ .................................................... F25B 13/00
[52] U.S. Cl. ................................ 62/230; 62/236; 62/244
[58] Field of Search ......................... 62/133, 151, 230, 62/236, 229, 228.4, 278, 277, 323.3, 323.1, 324.1, 324.5, 239, 244, 243, 154, 155, 156

[56] References Cited

U.S. PATENT DOCUMENTS

| | | | |
|---|---|---|---|
| 3,004,399 | 10/1961 | Keller | 62/278 X |
| 5,033,672 | 7/1991 | Sakamoto et al. | 62/133 X |
| 5,275,011 | 1/1994 | Hanson et al. | 62/229 X |

FOREIGN PATENT DOCUMENTS 5155233 6/1993 Japan.
5147420 6/1993 Japan.

Primary Examiner—Harry B. Tanner
Attorney, Agent, or Firm—Cushman, Darby & Cushman

[57] ABSTRACT

An air conditioning system that can operate an air conditioner of an electric vehicle without interfering with the charging process, which utilizes a secondary battery. When operation of the vehicle is terminated and the control system determines that a frosting judgment decision is positive, the control system judges whether the charging current has dropped to a specified level or less. As soon as the charging current has dropped to or below the specified level, the excess charging current may be used for a defrosting operation. When the operation of the vehicle is stopped and the control system determines that a frosting judgment decision is negative, the control system judges whether a preliminary air conditioning switch is on. If the preliminary air conditioning switch is on, it is judged whether charging of the secondary battery is in progress. If charging is progressing, the control system determines whether the charging current has dropped to or below a specified level. As soon as the charging current has dropped to or below this specified level, preliminary air conditioning is performed to cool or warm the cabin of the vehicle during charging of the secondary battery.

4 Claims, 21 Drawing Sheets

FIG. 4

| MODE OF REFRIGERANT CYCLE 55 | INPUT | | OUTPUT |
|---|---|---|---|
| | COMPRESSOR 56 | OUTPUT DATE OF EACH SENSOR | MODE OF OUTSIDE FAN 89 |
| COOLING | ON | Tam  22 →← 25 (°C) | Hi / Lo |
| HEATING | ON | Tam  13 →← 16 (°C) | Hi / Lo |
| DEHUMIDIFING | ON | Te  2 →←× 3  4 (°C) | Hi / Lo / OFF |
| DEHUMIDIFING | ON | Pd  17 →←× 18  19 (kgf/cm²G)  Td  109 →← 110 (°C) | Hi / Lo / OFF |

DEHUMIDIFICATION

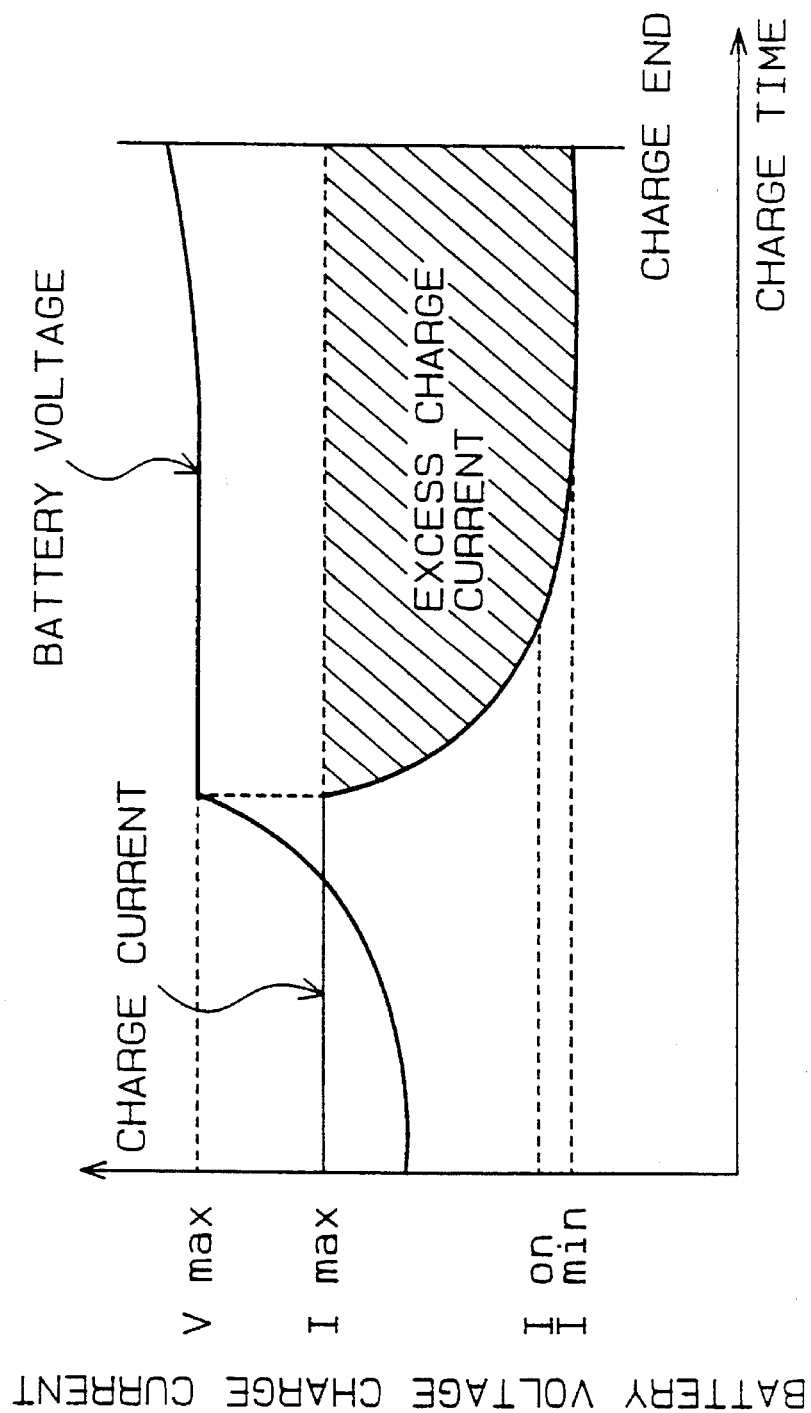

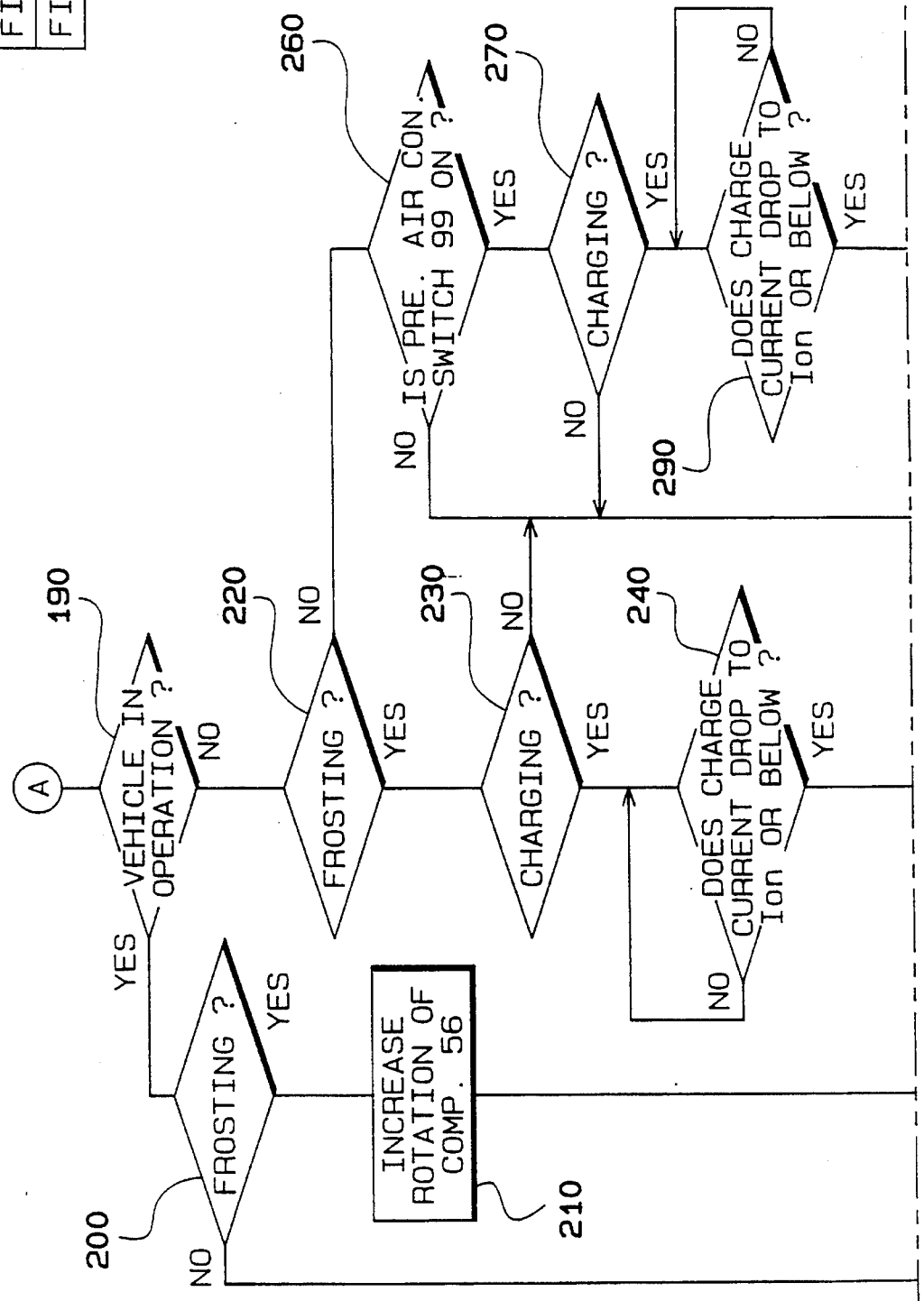

+B: OFF→ON

IG·B OR CH·B OFF→ON

INITIALIZATION — 400

START
SENSOR INPUT, EXTERNAL
SIGNAL INPUT, TIMER COUNTS — 410

420

450 — IS CHARGE SWITCH ON?
- NO →
- YES ↓

470 — IS FROSTING NECESSARY?
- NO →
- YES ↓

DEFROSTING CONTROL UNDER AN AIR CONDITIONING OPERATION PERMISSION SIGNAL

430 — IS PRE. AIR CONDITIONING NECESSARY?
- NO →
- YES ↓

490 — PRE. AIR CONDITIONING CONTROL BASED ON AIR CONDITIONING OPERATION PERMISSION SIGNAL

510 — CPU STOPS (LOW POWER CONSUMPTION)

AIR CONDITIONER CONTROL SYSTEM FOR ELECTRIC VEHICLES

CROSS REFERENCE TO RELATED APPLICATIONS

This application is based upon and claims priority from Japanese Patent Applications 5-302721 filed Dec. 2, 1993 and Japanese Patent Application 6-253188 filed Oct. 19, 1994, the contents of each being incorporated herein by reference.

BACKGROUND OF THE INVENTION

1. Field of the Invention

The present invention relates to an air conditioner control system for an electric vehicle. More particularly, the present invention relates to an air conditioner that is able to operate itself during charging of a secondary battery of the electric vehicle.

2. Related Art

It has been known to use secondary batteries to power air conditioners installed on electric vehicles, with the secondary batteries on the vehicle also serving to power the vehicles. Therefore, it is necessary to minimize the power consumption by the air conditioner while it is running during running, in order to lengthen the travel distance of the electric vehicle by reducing drain on the battery. For this purpose, "preliminary air conditioning" has been proposed. In preliminary air conditioning, the air conditioner is operated to cool or warm an interior of the vehicle during charging of the secondary battery, the charging occurring when the vehicle is stopped.

However, unlimited preliminary air conditioning may retard the charging ability of the secondary battery due to the current consumed by the air conditioner. The limited charging ability of the secondary battery and the maximum charge current are affected by the operation of the air conditioner. Thus, the charging time is unnecessarily prolonged. This increase in charging time is in conflict with the desire to reduce the charging-time of electric vehicles, which is a major technological challenge for electric vehicles.

SUMMARY OF THE INVENTION

An object of the present invention is to provide an air conditioner control system for electric vehicles which can operate the air conditioner during a charging operation without lowering the charging ability. To achieve this object, an air conditioner control system comprises a current sensing means for sensing the charge current to the secondary battery, and a control means for operating the air conditioner as necessary when the charge current sensed by the current sensing means has dropped to a specified level or below during charging of the secondary battery.

When a secondary battery is charged, as shown in FIG. 7, the maximum charging ability (maximum charge current Imax) of the charge circuit is used at the beginning of the charging process, and, when the charge voltage of the secondary battery (hereinafter referred to as the "battery voltage") has reached the rated voltage Vmax, constant-voltage charging is performed, where the charge current is saved so that the battery voltage does not exceed the rated voltage Vmax. Then, the charge current gradually decreases and, after the charge current has dropped to the minimum Imin, constant-current charging is performed at the minimum current Imin until charging is completed.

Since the charge current is saved after the battery voltage has reached the rated voltage Vmax, the current represented by the hatched area in FIG. 7 (excess charge current) can be used for air conditioning without interfering with the charging of the secondary battery.

Noting this fact, the present invention makes use of the current represented by the hatched area in FIG. 7 (excess charge current) for the operation of the air conditioner.

According to the present invention, the control means compares the charge current sensed by the current sensing means with a specified level (e.g., Ion in FIG. 7), and operates the air conditioner as necessary when the charge current sensed has dropped to the specified level or below during charging. The term "as necessary" means that, for example, preliminary air conditioning or defrosting is performed during charging if necessary, and the air conditioner is not operated if unnecessary.

Furthermore, the air conditioning control means operates the air conditioner after a specified time from the start of charge control by the charge control means when preliminary air conditioning of the interior of the electric vehicle is necessary, and sends a starting signal to the charge control means throughout the operation. Thus, the charge control means starts up and performs charge control, enabling preliminary air conditioning by the air conditioner even though the secondary battery is involved in the charging process.

BRIEF DESCRIPTION OF THE DRAWINGS

These and other objects, features, and characteristics of the present invention, as well as the method of operation and the function of related parts, will be better understood by a study of the following detailed description, the appended claims, and the drawings, all of which form a part of this application. In the drawings:

FIG. 4 is a diagram showing the relation between the operation mode of the refrigerating cycle and the operation mode of the exterior fan;

FIG. 7 illustrates a charging characteristic diagram showing the changes in the battery voltage and the charge current over time during charging of the second battery;

DETAILED DESCRIPTION OF THE PRESENTLY PREFERRED EXEMPLARY EMBODIMENTS

Figure 1:
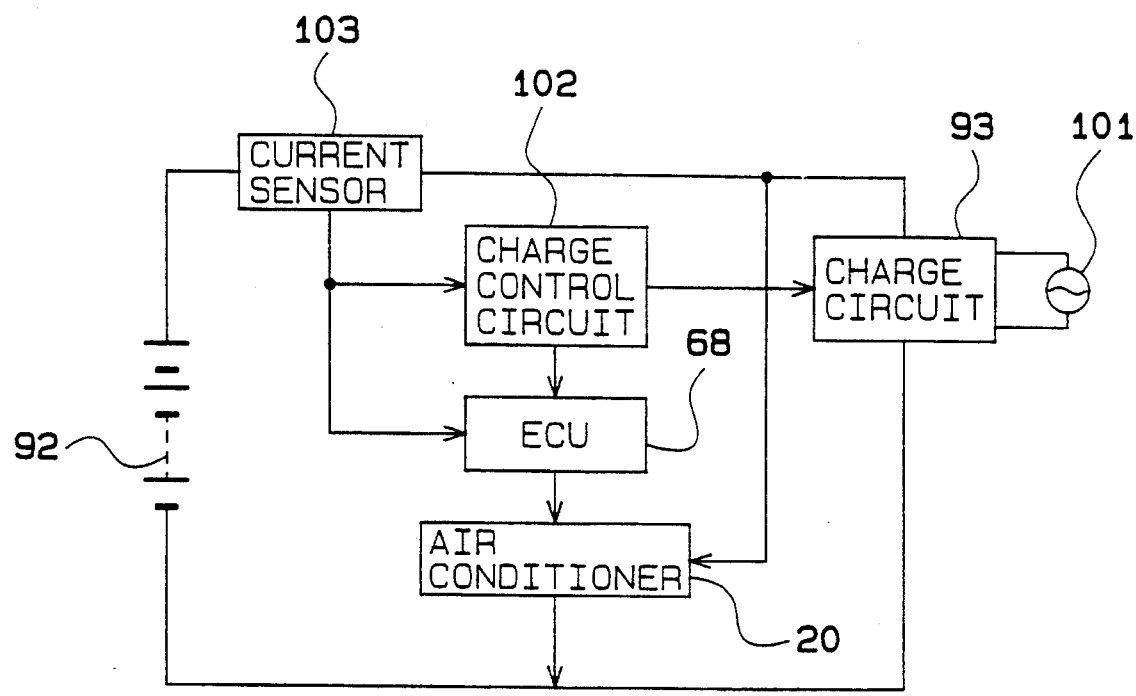
FIG. 1 is a general block diagram for the first embodiment of the present invention.

The first embodiment of the present invention is explained by referring to FIGS. 1 through 9. First, the entire construction of the air conditioner 20 is briefly explained using FIG. 2. On the upstream side of blow case 21 are exterior air inlet 22, which draws air from outside the vehicle, i.e., exterior air, and two interior air inlets 23 and 24, which draw air from inside the vehicle, i.e., interior air. Between interior air inlet 23 and exterior air inlet 22 is interior-exterior air damper 25. The direction of interior-exterior air damper 25 is regulated by servo motor 26 to change the ratio of the air drawn through exterior air inlet 22 and interior air inlets 23 and 24, thus enabling control of the intake air temperature. On the downstream side of interior-exterior air damper 25 and downstream of interior air inlet 24 are blowers 27 and 28, respectively, which work as a blowing means. Blowers 27 and 28 are attached to the armature of blower motor 29. Blower motor 29 is driven by driving circuit 30.

Downstream of blowers 27 and 28 is evaporator 31. The space downstream of evaporator 31 is divided into two passages, upper and lower passages 33 and 34 by partition 32. In lower passage 34, condenser 35 is disposed, which functions as an interior heat exchanger. The top of condenser 35 projects into upper passage 33. Above condenser 35 is cooling damper 36. Cooling damper 36 is driven by servo motor 37 to change the air flow that bypasses condenser 35. Partition 32 downstream of condenser 35 has a through hole 32a, where through damper 38 is provided. Through damper 38 is driven by servo motor 39 to change the air flow that passes through hole 32a provided in partition 32, in order to reduce the flow resistance when the air conditioner is in the single mode, such as "VENT" mode or "DEF" mode.

On the downstream end of upper passage 33 are a defroster outlet 40 and ventilation outlet 41. Ventilation outlet 41 and defroster outlet 40 are provided with dampers 48 and 49, respectively. Dampers 48 and 49 are driven by servo motors 50 and 51, respectively. On the downstream end of lower passage 34 is foot side outlet 52 for blowing air toward the passenger's feet. Foot side outlet 52 also has damper 54 driven by servo motor 53.

Evaporator 31 and condenser 35 are part of refrigerating cycle 55, which also functions as a heat pump and works as an air temperature control means. Refrigerating cycle 55 is composed of compressor 56, four-way switch valve 57, exterior heat exchanger 58, check valves 59 and 60, capillary 61, solenoid valves 62, 63, and 64, pressure reducing valve 65, accumulator 90, evaporator 31, and condenser 35, which are connected with piping. Solenoid valves 62, 63, and 64 and four-way switch valve 57 are switched according to the operation mode of refrigerating cycle 55 as shown in Table 1:

TABLE I

| Input | Output | | | |
|---|---|---|---|---|
| Mode of Refrigerating Cycle 55 | Solenoid Valve 62 | Solenoid Valve 63 | Solenoid Valve 64 | Four-Way Switch valve 57 |
| OFF | OFF | OFF | OFF | OFF (SOLID LINE) |
| COOLING | OFF | OFF | OFF | ON (DOTTED LINE) |
| HEATING | ON | OFF | OFF | OFF (SOLID LINE) |
| DEFROSTING | OFF | ON | OFF | OFF (SOLID LINE) |
| DEHUMIDIFYING H | OFF | OFF | ON | OFF (SOLID LINE) |
| DEHUMIDIFYING C | OFF | ON | OFF | OFF (SOLID LINE) |

Figure 2:
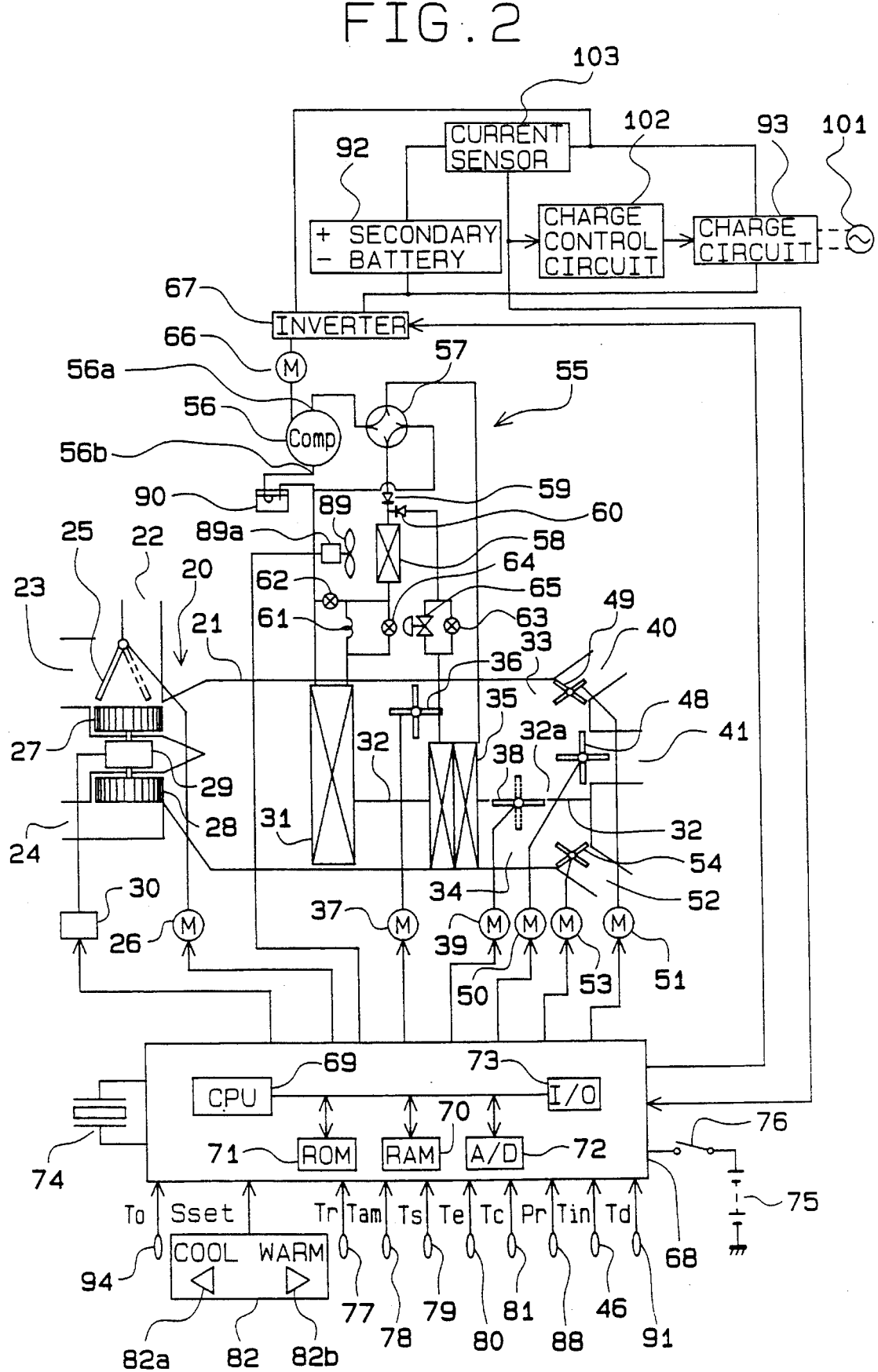
FIG. 2 is a schematic view showing the construction of the entire air conditioner.

As shown in Table 1, in the cooling mode, four-way switch valve 57 is switched to the position represented by the dotted line in FIG. 2 ("ON" position). Under this condition, the refrigerant discharged through outlet 56a of compressor 56 is cycled into check valve 59 to exterior heat exchanger 58 to capillary 61 to evaporator 31 to accumulator 90 and then to inlet 56b of compressor 56. Thus, hot refrigerant gas discharged through outlet 56a of compressor 56 is cooled in exterior heat exchanger 58 so that it turns to liquid. The liquidized refrigerant is evaporated in evaporator 31 to cool the air that passes through evaporator 31.

On the other hand, in the heating mode, four-way switch valve 57 is switched to the position represented by the solid line in FIG. 2 ("OFF" position). Under this condition, the refrigerant discharged through outlet 56a of the compressor 56 is cycled in the following order to condenser 35, pressure reducing valve 65, check valve 60, exterior heat exchanger 58, solenoid valve 62, accumulator 90, and then to inlet 56b of compressor 56. Thus, hot refrigerant gas discharged through outlet 56a of compressor 56 is cooled in condenser 35 so that it turns to liquid. The emitted heat warms the air that passes through condenser 35.

In the defrosting mode, four-way switch valve 57 is switched to the position represented by the solid line in FIG. 2, with solenoid valve 63 opened. Hot refrigerant gas discharged through outlet 56a of compressor 56 is supplied to exterior heat exchanger 58 via condenser 35 and solenoid valve 63, defrosting the surface of exterior heat exchanger 58.

In the H dehumidifying mode, four-way switch valve 57 is switched to the position represented by the solid line in FIG. 2, with solenoid valve 63 closed and solenoid valve 64 opened. A portion of the liquid refrigerant supplied to exterior heat exchanger 58 is also supplied to evaporator 31, which cools and, thus, dries the air. The cooled and dried air is reheated in condenser 35, where the heat acquired in evaporator 31 and exterior heat exchanger 58 is emitted, resulting in a relatively hot air discharge. In the C dehumidifying mode, four-way switch valve 57 is switched to the position represented by the solid line in FIG. 2, with solenoid valve 63 opened. Exterior heat exchanger 58 assumes a condensing function together with condenser 35. The refrigerant liquidized both by condenser 35 and exterior heat exchanger 58 is supplied to evaporator 31, where the air is cooled and, thus, dried. In the C dehumidifying mode, the heat acquired in evaporator 31 is emitted both in condenser 35 and exterior heat exchanger 58, resulting in a relatively cool air discharge.

Exterior heat exchanger 58 has exterior fan 89 for forced cooling. Fan motor 89a of exterior fan 89 can be switched between high speed operation "Hi", low speed operation "Lo", and a stationary condition "OFF", according to the operation mode of refrigerating cycle 55 and the outputs of the sensors, explained later, as shown in FIG. 4. For example, in the cooling mode, the operation is "Hi" when exterior temperature Tam sensed by exterior temperature sensor 78° is 25° C. or more, and "Lo" when Tam is 22° C. or less. In the heating mode, on the other hand, the operation is "Hi" when exterior temperature Tam is 13° C. or less, and "Lo" when Tam is 16° C. or more. In the H dehumidifying mode, the operation is "OFF" when the temperature of the air immediately after passing through evaporator 31 ("evaporator outlet temperature") Te is 4° C. or more, "Hi" when Te is 2° C. or less, and "Lo" when Te is in the range of 3° to 4° C. or 3° to 2° C. In the C dehumidifying mode, the operation is determined based on refrigerant discharge pressure Pr of compressor 56 sensed by refrigerant discharge pressure sensor 88, and refrigerant discharge temperature Td of compressor 56, according to the priority of Hi>Lo>OFF. For example, if the refrigerant discharge pressure Pr is 19 kgf/cm² G or more, the operation is always "Hi" regardless of the value of Td.

Motor 66 that drives compressor 56 of refrigerating cycle 55 is driven by inverter 67. Inverter 67 turns the direct current power at a voltage, such as 200 to 300 V, supplied by secondary battery 92, which is a power supply for driving the vehicle, into alternating current power. The frequency of the alternating current determines the speed of motor 66. Inverter 67, servo motors 26, 37, 39, 50, 51, and 53, fan motor 89a of exterior fan 89, and driving circuit 30 of blower motor 29 are controlled by electronic control unit for the air conditioner 68 ("air conditioner ECU"), which works as an air conditioning control means. Having a microcomputer as a main component, air conditioner ECU 68 also includes CPU 69, RAM 70 for temporary storage of various data, etc., ROM 71 that stores the control program shown in FIGS. 5 and 6, etc., explained later, A/D converter 72 that converts input data to digital values, I/O unit 73, and quartz oscillator 74 that generates standard signals at several megahertz. Air conditioner ECU 68 is powered by battery 75 through ignition switch 76.

Air conditioner ECU 68 reads various sensor signals via A/D converter 72 from interior temperature sensor 77 for sensing interior temperature Tr, exterior temperature sensor 78 for sensing exterior temperature Tam, solar sensor 79 for sensing solar radiation into the cabin Ts, evaporator outlet temperature sensor 80 for sensing evaporator outlet temperature Te, condenser outlet temperature sensor 81 for sensing temperature Tc of the air immediately after passing through condenser 35 ("condenser outlet temperature"), refrigerant discharge pressure sensor 88 for sensing refrigerant discharge pressure Pr of compressor 56, temperature preference setting device 82 with which the passenger manually sets temperature preference Sset as a target value for control, intake air temperature sensor 46 for sensing temperature Tin of the air drawn in by evaporator 31 ("intake air temperature"), discharge temperature sensor 91 for sensing refrigerant discharge temperature Td, exterior heat exchanger temperature sensor 94 for sensing temperature To of exterior heat exchanger 58 (having refrigerant therein), etc.

Figure 3:
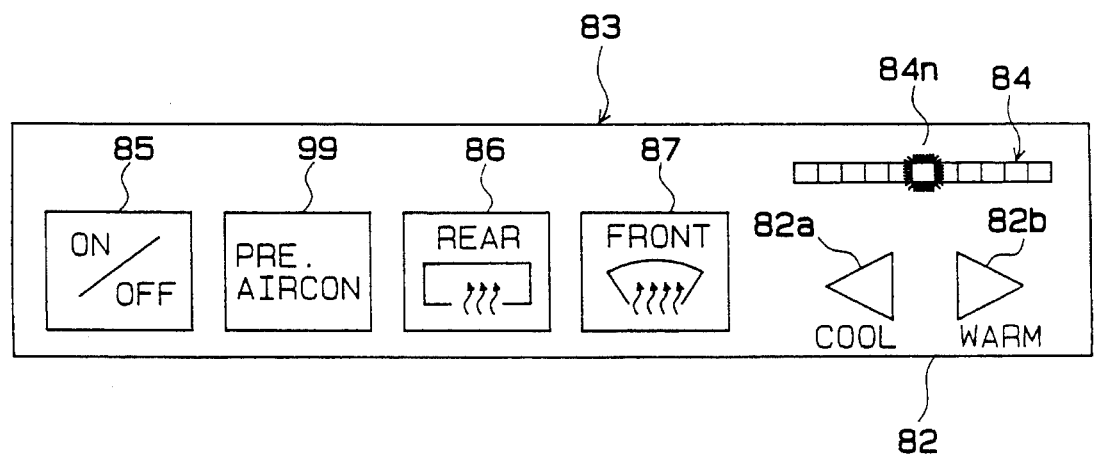
FIG. 3 is a front view of the air conditioner control panel.

Temperature preference setting device 82, equipped with cool key 82a and warm key 82b, is installed on air conditioner control panel 83 in the center of the vehicle's instrument panel (not shown in the figure). Air conditioner control panel 83, as shown in FIG. 3, includes temperature preference display 84, in which several light emitting elements 84n are horizontally disposed above the temperature preference setting device 82. Temperature preference display 84 is for displaying temperature preference setting Sset, which is set by using cool key 82a and warm key 82b. Temperature preference setting Sset indicates how cool or warm it should be as compared to the average temperature of 25° C., see FIG. 8A. Air conditioner control panel 83 also has air conditioner on/off switch 85, rear defogger switch 86, front defroster switch 87, and preliminary air conditioning switch 99.

Secondary battery 92 mentioned above is charged by external power supply 101 via charge circuit 93. Charge circuit 93 is controlled by charge control circuit 102, which works as a charge control means. During charging, the charging current flowing into secondary battery 92 is sensed by current sensor 103, which works as a current sensing means. The sensing signal is sent both to charge control circuit 102 and air conditioner ECU 68 (see FIG. 1).

Charge control circuit 102 determines the charging current and the charging voltage (battery voltage) based on the output signal from current sensor 103, and controls charge circuit 93 in order to regulate the charging current and the battery voltage as shown in FIG. 7. Specifically, at the beginning of charging, the maximum charging ability (maximum charging current Imax) of charge circuit 93 is used. Then, the battery voltage slowly rises. After the battery voltage has reached rated voltage Vmax, constant-voltage charging is performed, where the charging current is saved so that the battery voltage does not exceed rated voltage Vmax. Then, the charge current gradually decreases. After the charge current has dropped to minimum Imin, constant-current charging is performed at the minimum current Imin until the end of charging.

If air conditioner 20 is operated during charge, charge control circuit 102 determines the charging current based on the output signal from current sensor 103, and controls the charge circuit 93 in order to increase the current from the charge current before the operation of air conditioner 20 to offset the current that will be consumed by air conditioner 20, so that the charge characteristic as shown in FIG. 7 is maintained during the operation of air conditioner 20.

Figure 5:
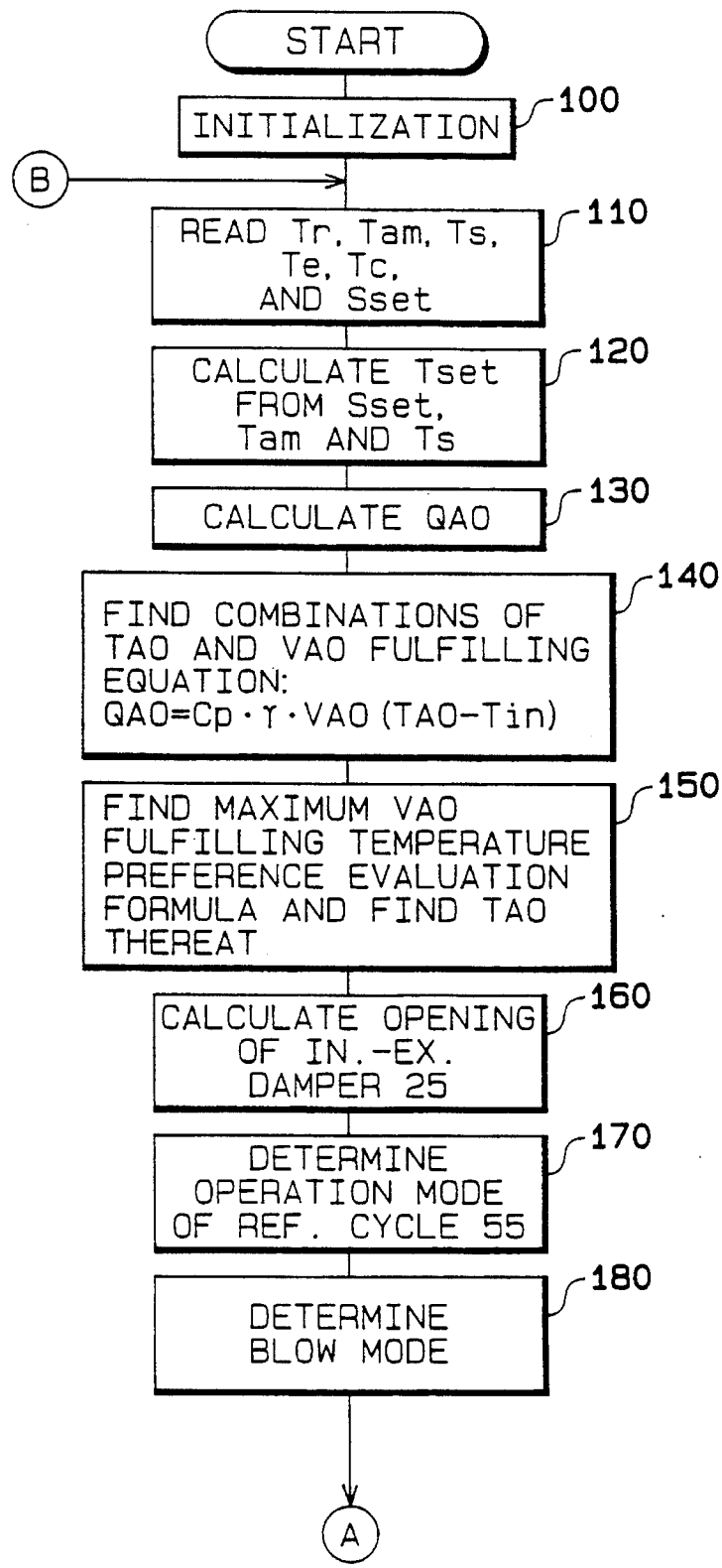
FIG. 5 illustrates a flowchart showing the control of the air conditioner ECU.
Figure 6:
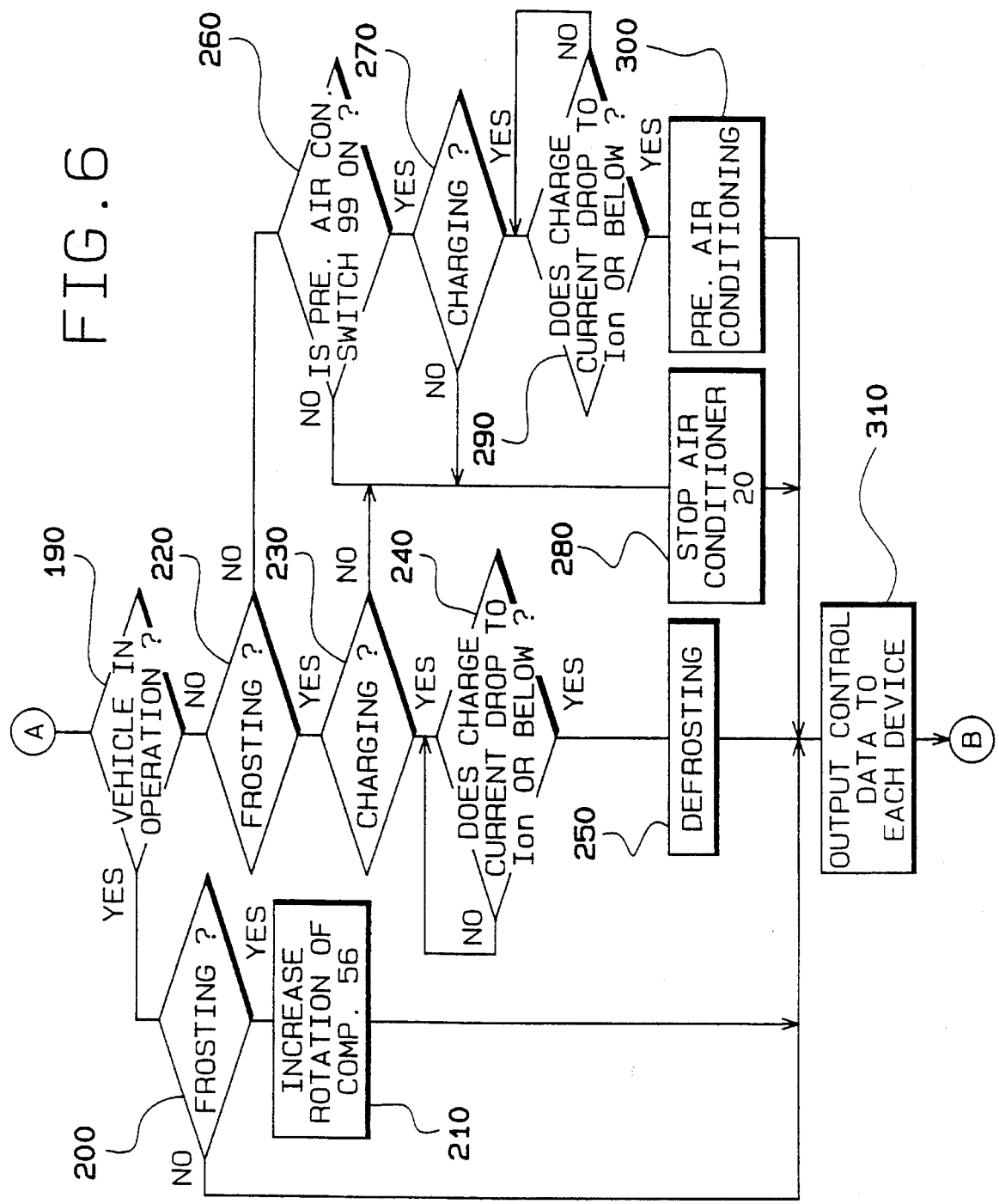
FIG. 6 shows a flowchart illustrating the control of the air conditioner ECU, with the steps of this flowchart occurring after the flowchart of FIG. 5.
Figure 8A:
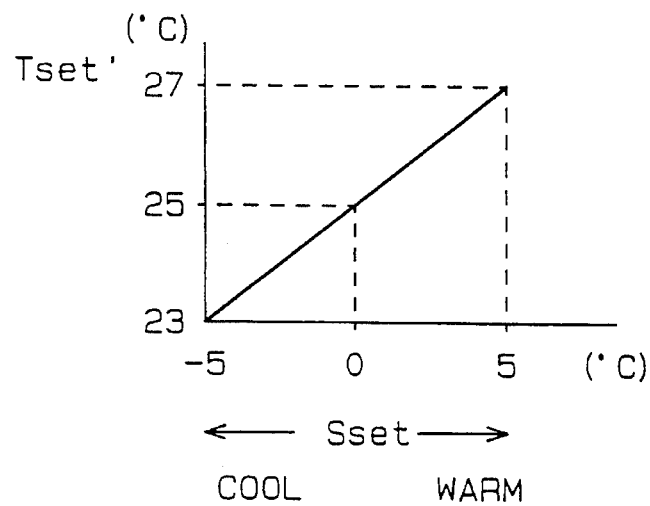
FIG. 8A shows the relation between the temperature preference setting Sset and Tset'.
Figure 8B:
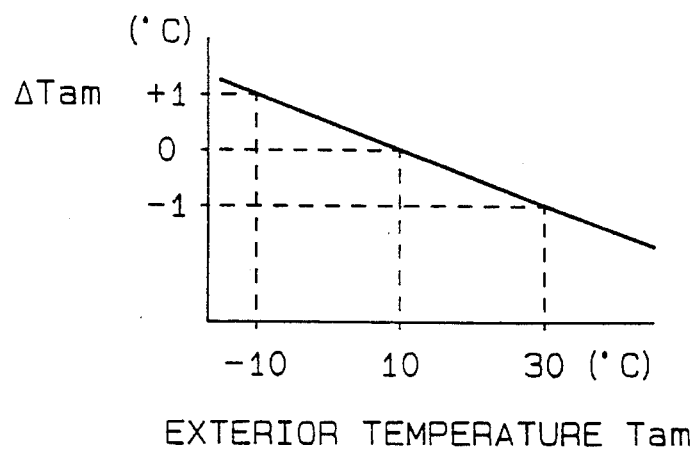
FIG. 8B illustrates the relation between the exterior temperature Tam and ΔTam.
Figure 8C:
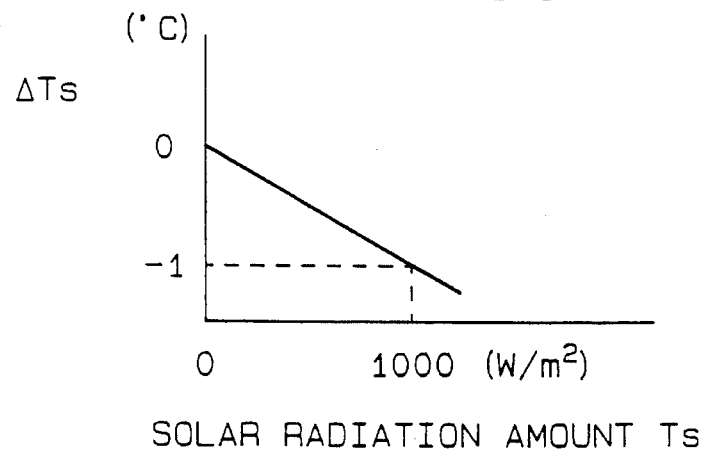
FIG. 8C depicts the relation between the solar radiation Ts and ΔTs.
Figure 9:
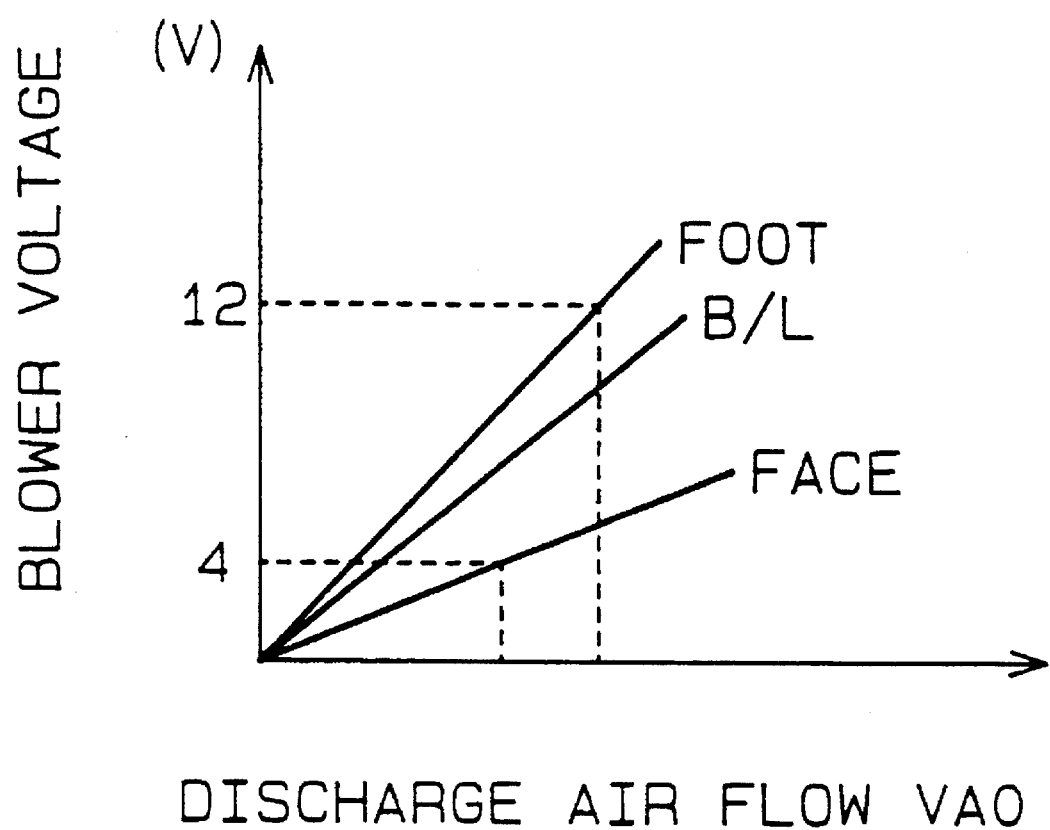
FIG. 9 portrays the relationship between the discharge air flow VA0 and the blower voltage.

Air conditioner ECU 68 executes the control program as shown in FIGS. 5 and 6 to control the air conditioner operation, while working as a control means by operating the air conditioner 20 as necessary when the charging current sensed by the current sensor 103 has dropped to the specified level Ion (see FIG. 7) or below during charging.

The following explains the control by air conditioner ECU 68, using the flowcharts shown in FIGS. 5 and 6. In the initialization process in step 100 of FIG. 5, the counters and flags used in subsequent processes are initialized. Next, in step 110, temperature preference Sset, which has been set via temperature preference setting device 82, is read, as well as interior temperature Tr, exterior temperature Tam, solar radiation Ts, evaporator outlet temperature Te, condenser outlet temperature Tc, intake air temperature Tin, and exterior heat exchanger (refrigerant) temperature To, which are sensed by interior temperature sensor 77, exterior temperature sensor 78, solar sensor 79, evaporator outlet temperature sensor 80, condenser outlet temperature sensor 81, intake air temperature sensor 46, and exterior heat exchanger temperature sensor 94, respectively.

Next, in step 120, temperature setting Tset is calculated based on temperature preference Sset, exterior temperature Tam, and solar radiation Ts, by using equation (1) below:

$$Tset = f(Sset, Tam, Ts) = Tset' + \Delta Tam + \Delta Ts \quad (1)$$

where,

Tset'=25+0.4Sset ... See FIG. 8A;

ΔTam=(10−Tam)/20 ... See FIG. 8B; and

ΔTs=−Ts/1000 ... See FIG. 8C.

After the temperature setting Tset is calculated as shown above, step 130 is executed to calculate the quantity of heat QA0 necessary to maintain the cabin at the temperature setting Tset, by using equation (2) below:

$$QA0 = K1 \times Tset - K2 \times Tr - K3 \times Tam - K4 \times Ts + C \quad (2)$$

where K1, K2, K3, and K4 are coefficients, and C is a constant.

After the quantity of heat necessary QA0 is calculated by using equation (2), step 140 is executed to find the combinations of the discharge air temperature TA0 and the discharge air flow VA0 that fulfill equation (3) below:

$$QA0 = Cp \circ \gamma \circ VA0(TA0 - Tin) \quad (3)$$

where, Cp denotes the specific heat of air, γ denotes the specific gravity of air, and Tin denotes the temperature of the air drawn in by evaporator 31.

Next, step 150 is executed, where maximum discharge air flow VA0 that fulfills the temperature preference evaluation formula (4) below and the corresponding discharge air temperature TA0 are determined, from among the combinations of the discharge air temperature TA0 and the discharge air flow VA0 that fulfill equation (3) above:

$$S = k1\{k2 + k3(ta-25) - k4(va-3) + k5(St-k6)\} - k7 \quad (4)$$

where,

S is the temperature preference indicating the comfort of the air conditioned state;

ta is the temperature of air blown against a passenger measured in °C.;

va is the speed of air blown against passenger measured in m/s;

St is the solar radiation on passenger measured in kcal/m2 h; and k1 to k7 are coefficients.

In electric vehicles such as in this embodiment, where power saving has been increasingly emphasized, it is a prerequisite to use settings of S=−1 or 0 in summer (cooling mode), and S=+1 or 0 in winter (heating mode), to meet the requirements both for comfort and power saving. On the other hand, in a combustion engine vehicle, where the requirement for power saving is not as strict as in the case of electric vehicles, emphasis is placed more heavily upon comfort, S=−2 in summer and S=+2 are considered the most comfortable settings.

The temperature of the air blown against the passenger ta is calculated based on discharge air temperature TA0 and discharge air flow VA0 by using equation (5) below:

$$\frac{ta}{TA0} = Kt \frac{\sqrt{C} A}{X^m} \quad (5)$$

where Kt denotes a coefficient determined by the form of the discharge port, C denotes the coefficient of contraction, A denotes the area of the discharge port, X denotes the distance from the discharge port to the passenger, and m denotes an index determined by the form of the discharge port.

The speed of the air blown against the passenger va is calculated by using equation (6) below:

$$\frac{va}{VA0} = Kt \frac{\sqrt{C} A}{X^n} \quad (6)$$

where Kv denotes a coefficient determined by the form of the discharge port, and n denotes an index determined by the form of the discharge port.

Also, solar radiation on the passenger St is calculated by using equation (7) below:

$$St = Ks \circ Ts \quad (7)$$

where Ks denotes a coefficient determined by the characteristics of solar sensor 79, and Ts denotes the output of solar sensor 79.

Using equations (5) through (7) above, the maximum discharge air flow VA0 that fulfills the temperature preference evaluation formula (4) and the corresponding discharge air temperature TA0 are calculated. Note that, as mentioned above, in electric vehicles, where power saving has been the subject of increased emphasis, it is a prerequisite to use the conditions of S=−1 or 0 in summer (cooling mode), and S=+1 or 0 in winter (heating mode), to meet the requirements both for comfort and power savings, while in combustion engine vehicle, S=−2 in summer and S=+2 in winter are the most comfortable settings. Therefore, in step 150 of FIG. 5, the maximum discharge air flow VAO and the corresponding discharge air temperature TA0 are calculated within the limitation of these comfortability conditions, i.e. in the range where comfort is not impaired. As a result, discharge air temperature TA0 is higher than in previous designs when cooling, and discharge air temperature TA0 is lower than previous designs when heating. The discharge air flow VA0 is larger than previous designs both when cooling and heating.

After step 150 is completed, step 160 is executed, where the direction of interior-exterior air damper 25 is calculated to reduce the difference between temperature, intake air temperature, Tin of the air drawn through interior air inlets 23 and 24 and exterior air inlet 22 and discharge air temperature TA0. Then, in step 170, the operation mode of refrigerating cycle 55 is selected from cooling or heating. Next, in step 180, the directions of dampers 36, 38, 48, 49, and 54 are determined, based on discharge air temperature TA0 and discharge air flow VA0, which have been determined in step 150 above, to select discharge mode from among "VENT", "B/L", "FOOT", "FOOT/DEF" and "DEF".

Next, in step 190 of FIG. 6, it is judged whether the vehicle is in operation. If the vehicle is in operation (YES), step 200 is executed, where frosting on exterior heat exchanger 58 is judged according to either of the frosting judgment criteria (1) through (4) below:

Frosting judgment criterion (1)
  Exterior temperature Tam—Exterior heat exchanger (refrigerant) temperature To≧Temperature setting.

Frosting judgment criterion (2)
  Exterior temperature Tam≦Temperature setting, and
  Heating operation time≧Time setting, and
  Exterior humidity≧Humidity setting.

Frosting judgment criterion (3)
  Exterior heat exchanger (refrigerant) temperature To≦Temperature setting, and
  Heating operation time≧Time setting, and
  Exterior humidity≧Humidity setting.

Frosting judgment criterion (4)
  Exterior temperature Tam—Exterior heat exchanger (refrigerant) temperature To≧Temperature setting, and
  Heating operation time≧Time setting, and
  Exterior humidity≧Humidity setting.

If the above criteria are met, a frosting judgment decision is positive (YES) in step 200. Then, in step 210, the speed of the compressor 56 is raised to increase the refrigerant discharge ability. This ensures heating ability under a frosting condition while reducing the drop in the discharge air temperature, to maintain the comfortability. After various control data are determined in steps 100 through 210, step 310 is executed, where the control data are sent to the devices in the air conditioner 20. Then the process returns to step 110 to control the air conditioning operation. In order to attain the discharge air flow VA0 determined in step 150, the blower voltage applied to blower motor 29 is determined according to the voltage characteristics shown in FIG. 9, depending on the discharge mode. If the discharge air temperature TA0 necessary to maintain the interior temperature at the temperature setting Tset can be attained by mixing the interior air and the exterior air, compressor 56 of refrigerating cycle 55 is stopped. If, on the other hand, the necessary discharge air temperature TA0 cannot be attained with the interior and exterior air, compressor 56 is driven by inverter 67 to operate refrigerating cycle 55 in the operation mode determined in step 170. In this case, in the cooling mode, evaporator outlet temperature Te sensed by evaporator outlet temperature sensor 80 is used for feedback control by means of PI control or fuzzy control. In the heating mode, condenser outlet temperature Tc sensed by condenser outlet temperature sensor 81 is used for feedback control by means of PI control or fuzzy control.

Then, when ignition switch 76 is turned off to finish the operation of the vehicle, the decision in step 190 becomes "NO", directing the process to step 220, where frosting on the exterior heat exchanger 58 is judged according to any of the frosting judgment criteria (1) through (4) mentioned earlier. If the frosting judgment decision is negative (NO) in step 220, the process proceeds to step 160, below will be explained later.

If the frosting judgment decision is positive (YES) in step 220, the process proceeds to step 230, to judge whether secondary battery 92 is being charged, i.e., whether the charge circuit 93 of the secondary battery 92 is connected to an external charging power supply. If the charging judgment decision is negative (NO), defrosting is not carried out in order to avoid the discharge of the secondary battery 92 (step 280).

If the charging judgment decision is positive ("YES" in step 230), step 240 is executed to judge whether the charging current has dropped to the specified level Ion (see FIG. 7) or below. If it exceeds the specified level Ion, the method process waits until charging current drops to the specified level Ion or below. Later, as soon as the charge current has dropped to the specified level Ion or below, the process proceeds to step 250, where a defrosting operation is carried out using the excess charge current (hatched area in FIG. 7). During the defrosting operation, four-way switch valve 57 is in the position represented by the solid line in FIG. 2, with solenoid valve 63 opened. Under this condition, the hot refrigerant gas discharged through outlet 56a of the compressor 56 is supplied to exterior heat exchanger 58 through the condenser 35 and the solenoid valve 63. Thus, the surface of exterior heat exchanger 58 is defrosted by the heat emitted by the hot refrigerant gas.

Current consumption by air conditioner 20 during defrosting is adjusted to fall in the range of the excess charge current (i.e., the hatched area in FIG.. 7) which does not drop the charge voltage of secondary battery 92 (battery voltage). This enables the use of the excess charging current to be used for the defrosting operation without interfering with charge.

If the operation is stopped ("NO" in step 190) and frosting judgment decision is negative ("NO" in step 220), step 260 is executed, to judge whether preliminary air conditioning switch 99 is on. If it is not on, preliminary air conditioning is not carried out (step 280). If the preliminary air conditioning switch 99 is on, the decision in step 260 is "YES", directing the process to step 270, to judge whether charge is progressing. If charge is not progressing, preliminary air conditioning is not carried out (step 280).

If charging is progressing ("YES" in step 270), step 290 is executed, judging whether the charge current has dropped to the specified level Ion (see FIG. 7) or below. If it exceeds the specified level Ion, the process waits until the charge current drops to the specified level Ion or below. Later, as soon as the charging current has dropped to the specified level Ion or below, the process proceeds to step 300, where preliminary air conditioning is carried out to cool or warm the cabin during charge. During the preliminary air conditioning, as in the defrosting operation explained before, the current consumption by air conditioner 20 is adjusted to fall in the range of the excess charge current (hatched area in FIG. 7). This enables the use of the excess charge current for preliminary air conditioning without interfering with charge.

Figure 10:
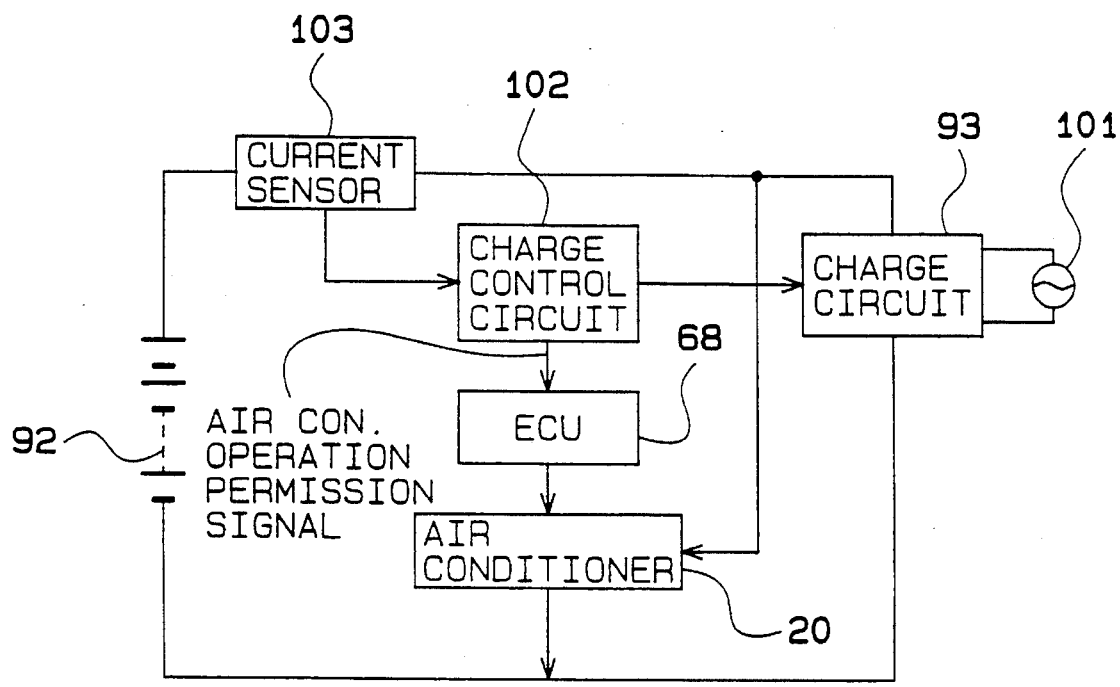
FIG. 10 pictures a block diagram of a second embodiment of the present invention.
Figure 11:
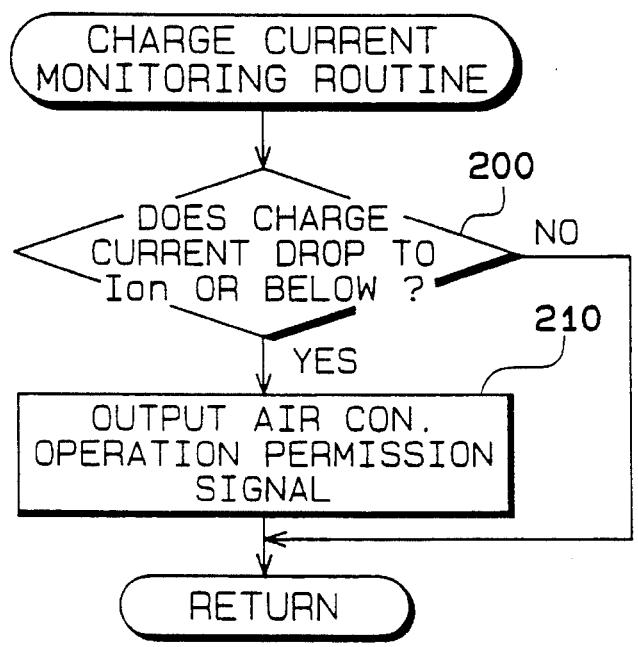
FIG. 11 depicts a flowchart illustrating the charge current monitoring routine executed by the charge control circuit.

In the first embodiment explained above, the judgment whether the charge current has dropped to the specified level Ion or below is performed by the air conditioner ECU 68 (air conditioning control means). However, as in the second embodiment of the present invention shown in FIGS. 10 through 12, the charge control circuit 102 (charge control means) may be designed to judge whether the charge current has dropped to the specified level Ion or below. In the second embodiment, charge control circuit 102 periodically repeats the charge current monitoring routine as shown in FIG. 11, by way of interruption, etc. to judge whether the charge current has dropped to specified level Ion or below (step 200). When the charge current has dropped to the specified level Ion or below, the process proceeds to step 210, where the charge control circuit 102 sends an air conditioner operation permission signal to the air conditioner ECU 68 to permit the operation of the air conditioner.

Figure 12:
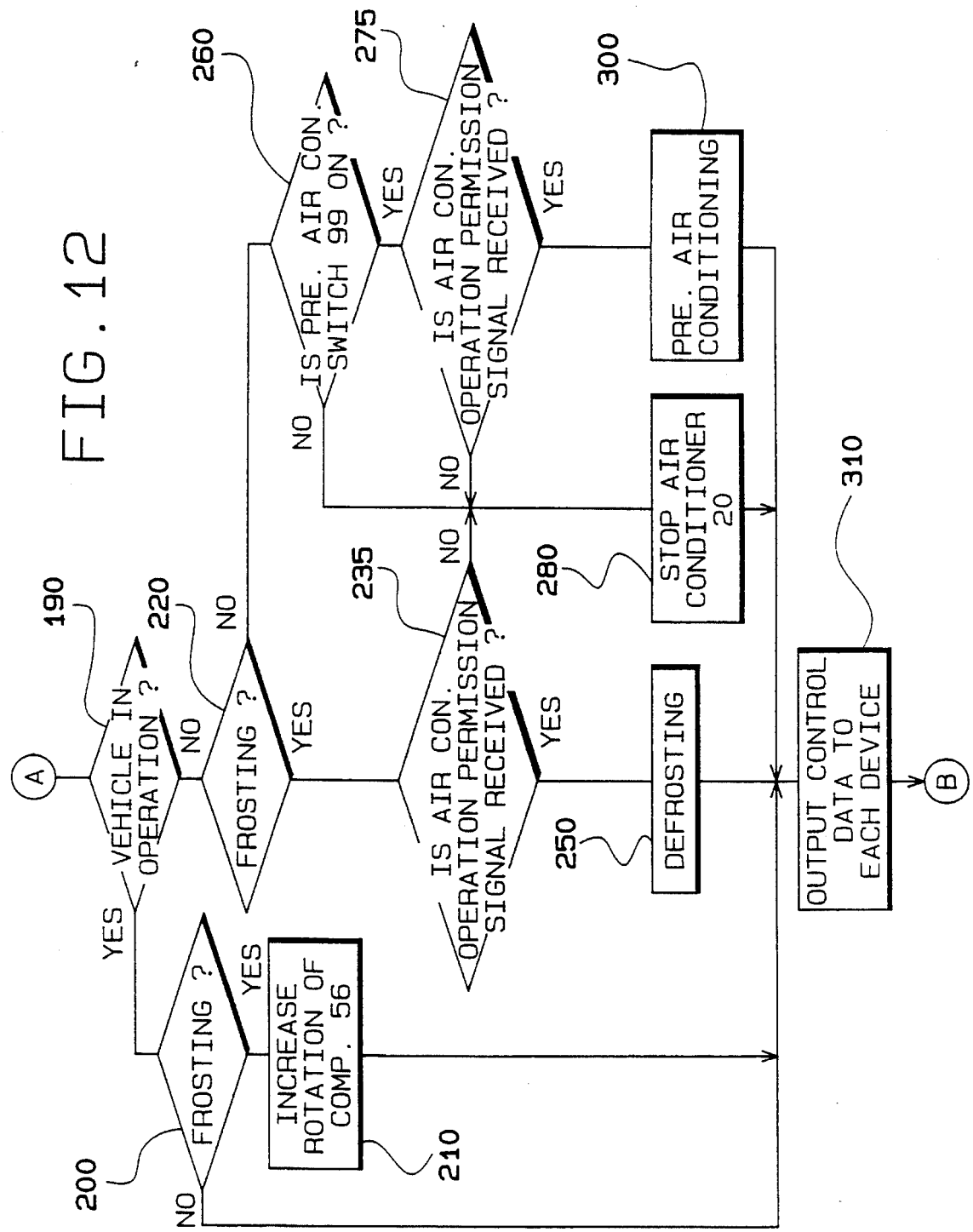
FIG. 12 illustrates a flowchart showing the control of the air conditioner ECU.

Control by the air conditioner ECU 68 is shown in FIG. 12.

The following explanation is limited to the differences from the first embodiment. If operation is stopped ("NO" in step 190) and the frosting decision judgment is positive ("YES" in step 220), step 235 is executed, to judge whether an air conditioner operation permission signal has been received from charge control circuit 102. If an air conditioner operation permission signal has not been received, the defrosting operation is not carried out (step 280). If an air conditioner operation permission signal has been received, the defrosting operation is carried out (step 250). This enables the use of the excess charging current for the defrosting operation when the charging current has dropped to the specified level Ion or below, as in the first embodiment.

If the operation is stopped ("NO" in step 190) and the frosting judgment decision is negative ("NO" in step 220), step 260 is executed, to judge whether preliminary air conditioning switch 99 is on. If it is not on, preliminary air conditioning is not carried out (step 280). If the preliminary air conditioning switch 99 is on, the process proceeds to step 275, to judge whether an air conditioner operation permission signal has been received from the charge control circuit 102. If an air conditioner operation permission signal has not been received, preliminary air conditioning is not carried out (step 280). If an air conditioner operation permission signal has been received, preliminary air conditioning is carried out (step 300). This enables the use of the excess charging current for preliminary air conditioning when the charging current has dropped to the specified level Ion or below, as in the first embodiment.

In the second embodiment explained above, the charge control circuit 102 (charge control means) only sends an air conditioner operation permission signal when the charge current has dropped to the specified level Ion or below, and does not judge whether air conditioning is actually in operation. Therefore, control by charge control circuit 102 is the same, whether the air conditioner 20 is operating or not. Normally, charge control is not affected since the air conditioner 20 is operated by the excess charging current. However, under such conditions where a large current flows temporarily at the start of operation of the air conditioner 20, the battery voltage may drop.

Figure 13:
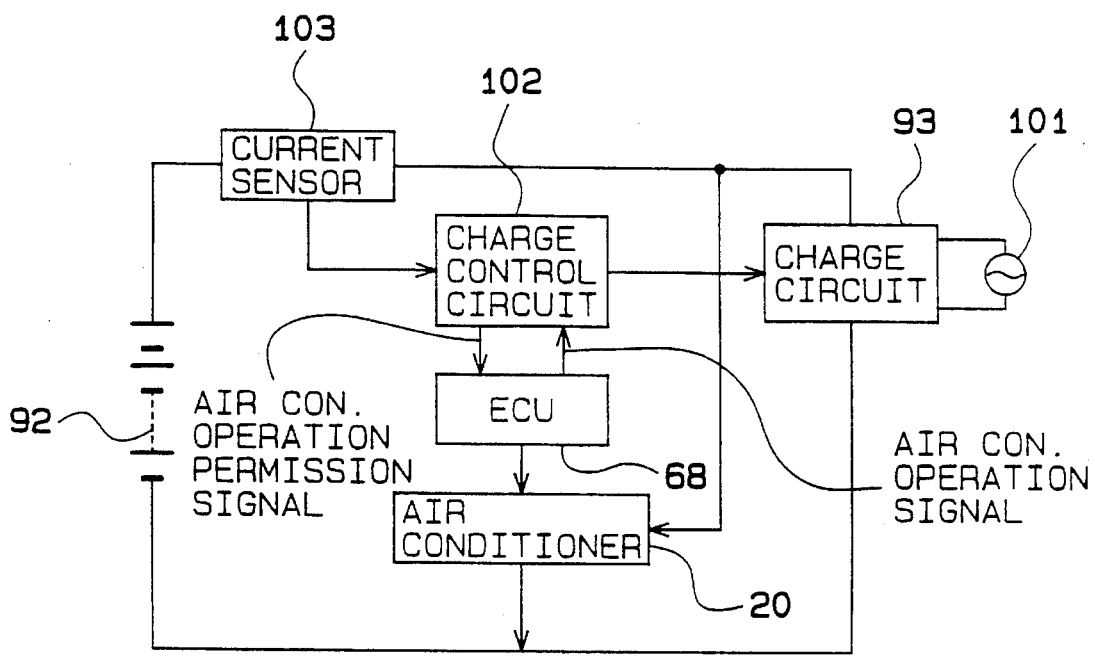
FIG. 13 is a block diagram of the third embodiment of the present invention.

The third embodiment of the present invention as shown in FIG. 13 serves to avoid the risk of a drop in battery voltage when current flows at the beginning of operation of air conditioner 20. Here, as in the second embodiment explained above, charge control circuit 102 sends an air conditioner operation permission signal to air conditioner ECU 68 when the charge current sensed by current sensor 103 has dropped to the specified level Ion or below during charge. Air conditioner ECU 68, upon receipt of the air conditioner operation permission signal, operates air conditioner 20 as necessary and sends an air conditioner operation signal to charge control circuit 102 to notify that air conditioner 20 is operating. In response to this, charge control circuit 102 corrects the charge control during the operation of air conditioner 20 according to a preset pattern, in order to prevent, for example, a drop in the battery voltage at the start of the operation of air conditioner 20.

Figure 14:
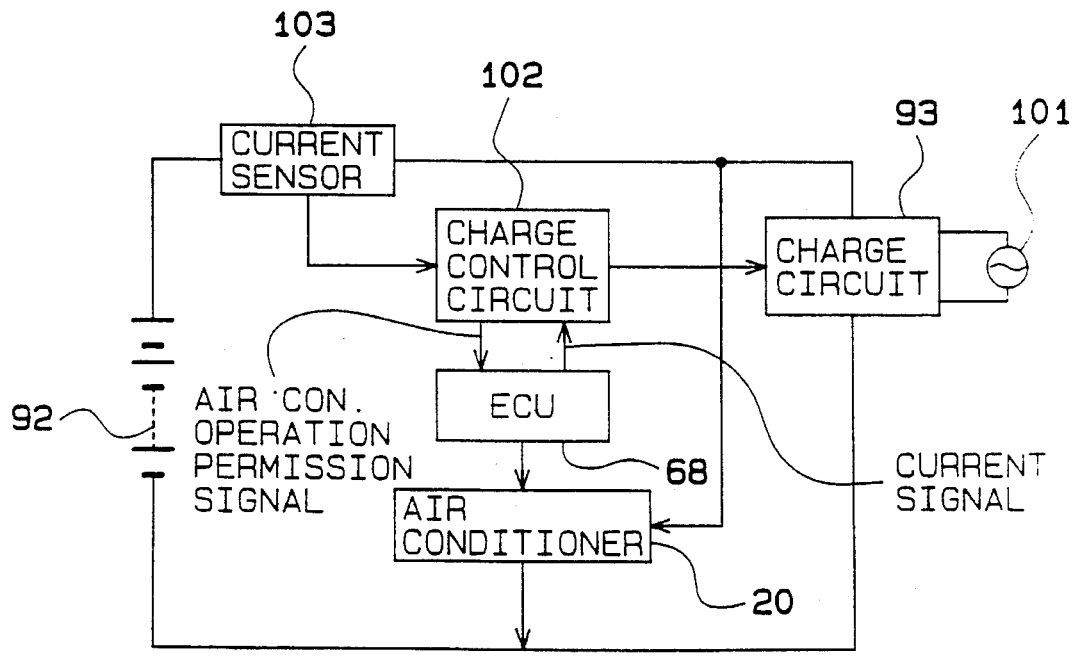
FIG. 14 is a block diagram illustrating the fourth embodiment of the present invention.

In the third embodiment explained above, the air conditioner ECU 68 sends an air conditioner operation signal to notify charge control circuit 102 whether air conditioner 20 is operating, either defrosting or preliminarily air conditioning. However, as in the fourth embodiment of the present invention shown in FIG. 14, a current signal may be sent to charge control circuit 102 according to the current consumed by air conditioner 20 to notify charge control circuit 102 of the current consumption by air conditioner 20.

In the fourth embodiment, charge control circuit 102 performs either charge voltage control or malfunction monitoring at the start of operation of air conditioner 20, according to the current signal, the current consumed by air conditioner 20, sent by air conditioner ECU 68. Thus, charge voltage control at the start of the operation of air conditioner 20 can be changed according to the current consumed by air conditioner 20, thereby improving the accuracy of the control from that in the third embodiment. Also, abnormalities, such as shorting, can be ascertained, based on the relation between the current signal sent by air conditioner ECU 68, current consumed by air conditioner 20, and the charging current sensed by current sensor 103, assisting in early detection of failures.

Figure 15:
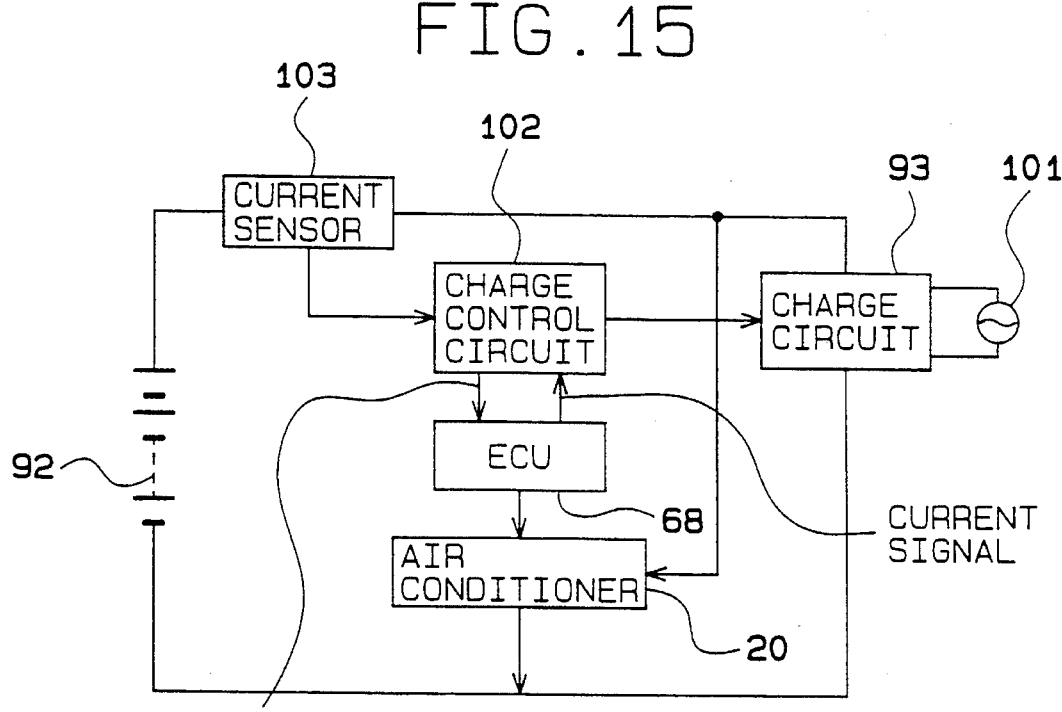
FIG. 15 is a block diagram of the fifth embodiment of the present invention.
Figure 16:
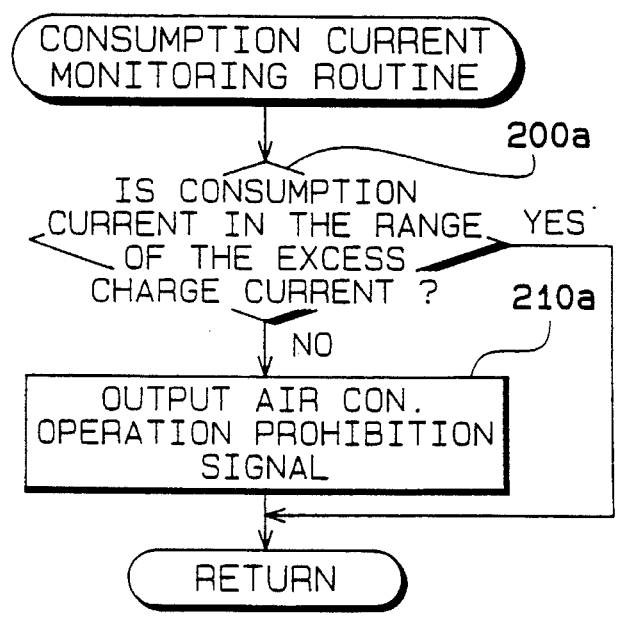
FIG. 16 illustrates a flowchart for the current consumption monitoring routine executed by the charge control circuit.

Also, in the fifth embodiment of the present invention, charge control circuit 102 periodically repeats the current consumption monitoring routine as shown in FIG. 16 by way of interruption, etc., to judge whether the current consumption by air conditioner 20 falls in the range of the excess charging current in step 200a, based on the current signal sent by air conditioner ECU 68. When the current consumption by air conditioner 20 has exceeded the range of the excess charging current, step 210a is executed to send an air conditioner operation prohibition signal to air conditioner ECU 68 (see FIG. 15). Air conditioner ECU 68, upon receipt of air conditioner operation prohibition signal, immediately stops operation of air conditioner 20 to prevent a drop in the charging ability.

Figure 17B:
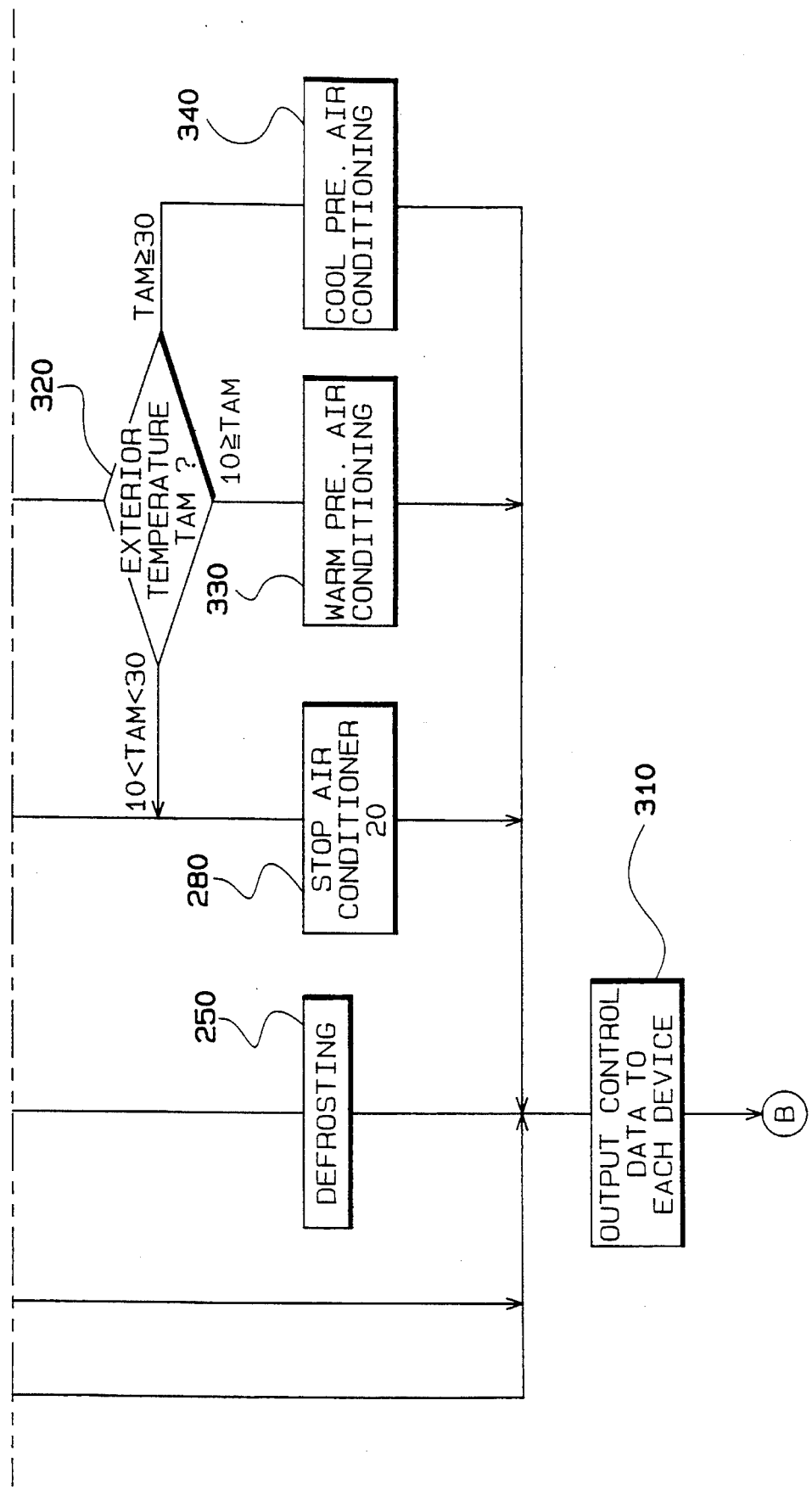
FIG. 17 consists of FIGS. 17A and 17B which together show a flowchart for the operation of the charge control circuit of the sixth embodiment of the present invention.

FIG. 17 shows the operation of the charge control circuit in the sixth embodiment of the present invention. The same steps as appearing in FIG. 6 are given corresponding step numbers, and are not explained here.

In FIG. 6, charge control circuit 102, before carrying out preliminary air conditioning, senses exterior temperature Tam via exterior temperature sensor 78, and judges whether preliminary air conditioning is necessary, and whether to carry out preliminary heating or preliminary cooling, based on the exterior temperature Tam in step 320. Charge control circuit 102 carries out preliminary heating when exterior temperature (intake air temperature) TAM is 10° C. or below (step 330), and preliminary cooling when exterior temperature Tam is 30° C. or above (step 340). In the intermediate temperature range, step 280 is executed to stop air conditioner 20. In the sixth embodiment, unnecessary power consumption by air conditioner 20 is reduced as compared to earlier embodiments, in which air conditioner 20 is operated for preliminary air conditioning even in the intermediate temperature range where operation of air conditioner 20 is not necessary.

FIGS. 18 through 23 illustrate the seventh embodiment of the present invention. The same elements that appear in the first embodiment are given corresponding symbols, and are not explained here. The seventh embodiment is characterized by the feature that, when air conditioning control of air conditioner 20 is unnecessary, air conditioner ECU shifts to the power-saving mode to reduce power.

Figure 18:
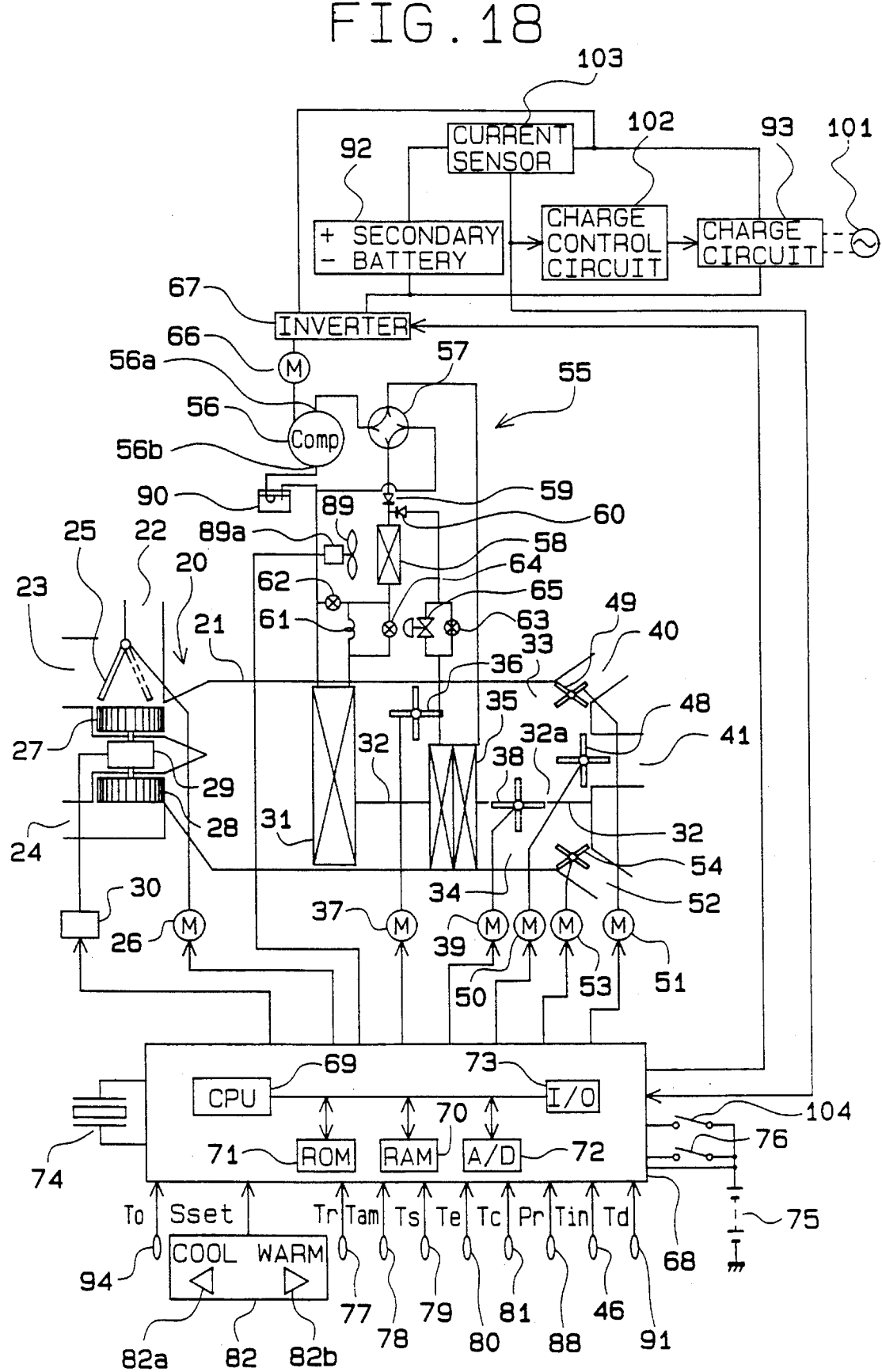
FIG. 18 is a schematic diagram showing the construction of the entire air conditioner in the seventh embodiment of the present invention.

In FIG. 18, which shows the entire construction, air conditioner ECU 68 is powered by battery 75 via the ignition switch 76, as well as directly by battery 75 and via the charge switch 104.

Figure 19:
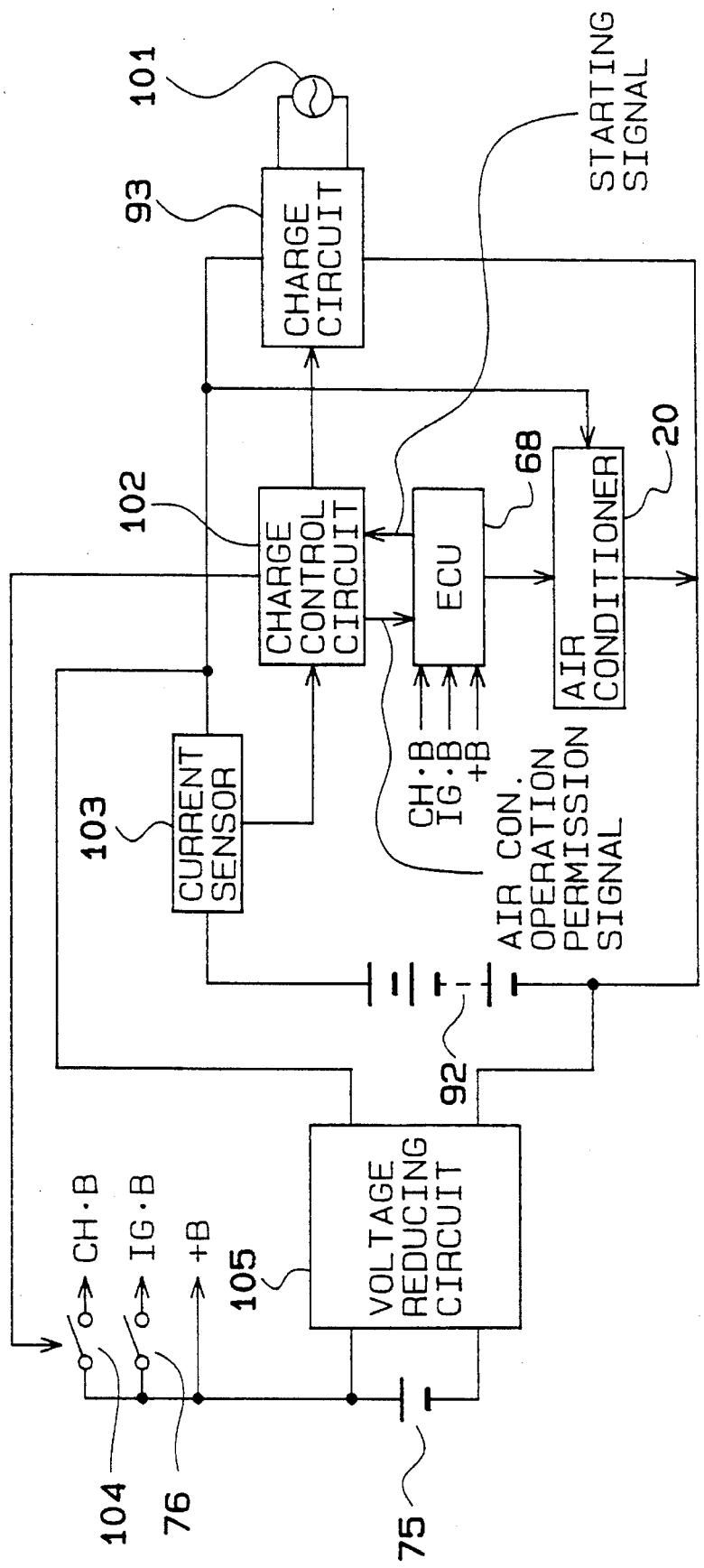
FIG. 19 is a general block diagram.

FIG. 19 is a block diagram that schematically shows the entire construction. In FIG. 19, battery 75 is powered by charge circuit 93 or secondary battery 92 via voltage reducing circuit 105. Voltage reducing circuit 105 operates when charge switch 104 is closed, and shifts to the power-saving mode when switch 104 opens. Charge control circuit 102 closes charge switch 104 when executing charge control, shifts to the power-saving mode when charge control is over, and inactivates the power-saving mode to execute charge control while a starting signal is being sent. Air conditioner ECU 68 sends a starting signal to charge control circuit 102 during specified period to be discussed below.

Figure 20:
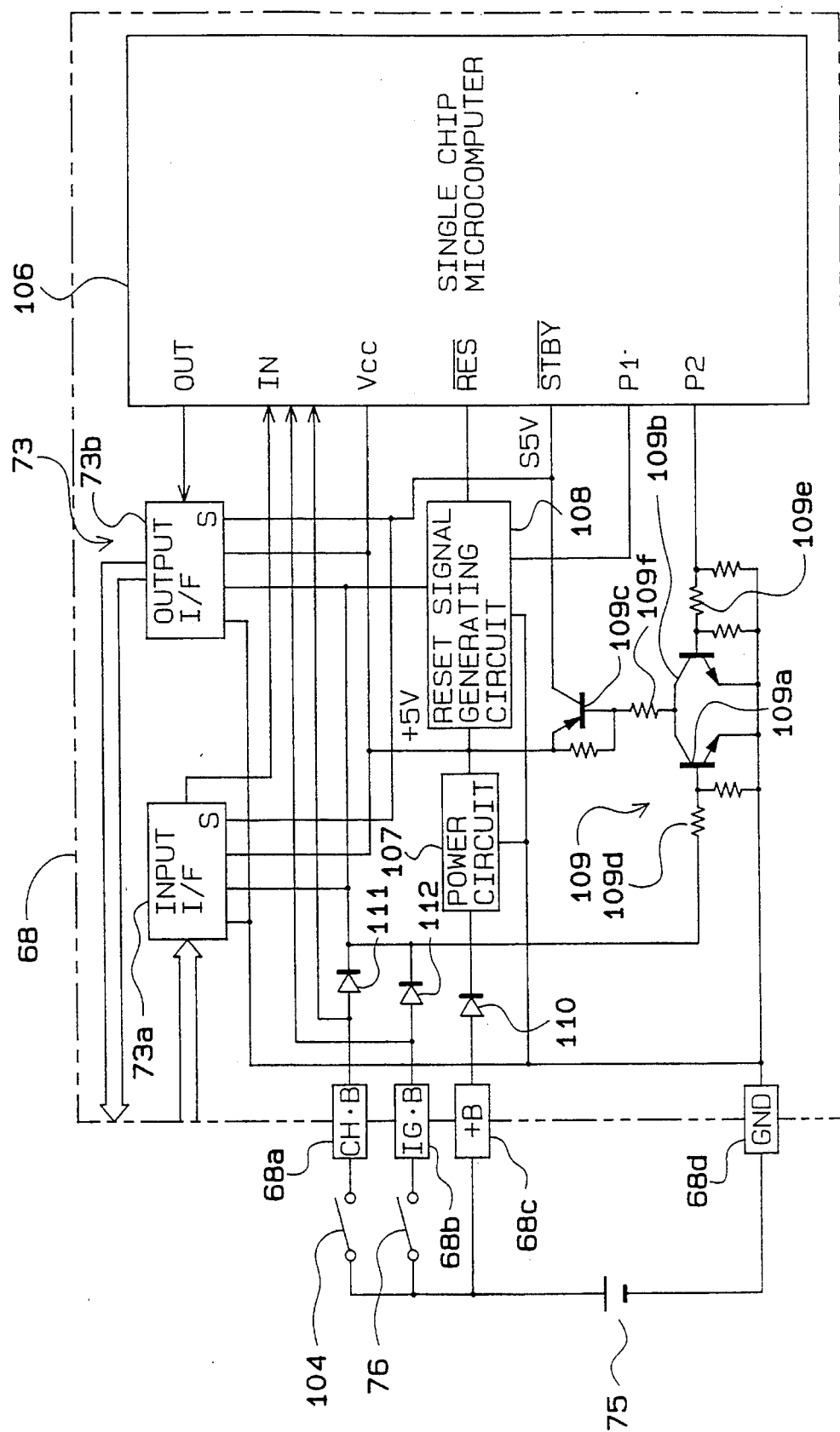
FIG. 20 is a schematic diagram illustrating the construction of the air conditioner ECU.

FIG. 20 is an electric circuit diagram schematically showing the construction of air conditioner ECU 68. In FIG. 20, the MCU (microcomputer unit) 106 of air conditioner ECU 68 comprises peripheral modules such as CPU 69, ROM 71, RAM 70, and A/D converter 72, which appear in FIG. 18. I/O unit 73 has input interface 73a and output interface 73b. Air conditioner ECU 68 itself comprises MCU 106, input interface 73a and output interface 73b, as well as power circuit 107, reset signal generating circuit 108, and starting circuit 109, which works as a starting means.

Voltage is applied to air conditioner ECU 68 by battery 75 via three passages as shown in FIG. 18. The following explains the constructions in more details.

Air conditioner ECU 68 has charge switch channel voltage input terminal 68a, ignition channel voltage input terminal 68b, battery voltage input terminal 68c, and ground terminal 68d. Charge switch channel voltage input terminal 68a is connected to 12 V power terminal of battery 75 via charge switch 104. Ignition channel voltage input terminal 68b is connected to 12 V power terminal of battery 75 via ignition switch 76. Battery voltage input terminal 68c is connected directly to 12 V power terminal of battery 75. Ground terminal 68d is connected to 0 V power terminal of battery 75.

Power circuit 107, connected to battery channel voltage input terminal 68c via diode 110 with the polarity as shown in the figure, converts 12 V voltage from battery 75 to 5 V voltage, and supplies the 5 V voltage to reset signal generating circuit 108, input interface 73a, output interface 73b, starting circuit 109, and Vcc terminal of MCU 106. Reset signal generating circuit 108 sends a low level reset signal to reset terminal $\overline{RES}$ of MCU 106 in the unstable state at 5 V voltage supplied by power circuit 107, and inactivates the sending of the reset signal in the stable state at 5 V. Reset signal generating circuit 108, endowed with a watchdog function, forcibly resets MCU 106 when a pulse signal is not sent through output port P2 of MCU 106 within a specified time.

Charge switch channel voltage input terminal 68a and ignition switch channel voltage input terminal 68b are connected to input interface 73a, output interface 73b, reset signal generating circuit 108, and starting circuit 109, via diodes 111 and 112 with the polarities shown in the figure.

Input interface 73a sends the sensing signals from various sensors to MCU 106 after matching their signal levels and communication timings. Output interface 73b sends the data from MCU 106 to the servo motors or inverter 67 after matching their signal levels and communication timings.

Starting circuit 109 includes first through third transistors, 109a through 109c. In first transistor 109a, the base is connected to resistor 109d and the output ends of diodes 111 and 112, whereas the emitter is connected to ground terminal 68d. In second transistor 109b, the base is connected via resistor 109e to output port P2 of MCU 106, whereas the emitter is connected to ground terminal 68d. In third transistor 109c, the emitter is connected to the output terminal of power circuit 107, whereas the base is connected via resistor 109f to the collectors of first and second transistors 109a and 109b, respectively, in a common connection, and the collector is connected to standby terminal $\overline{STBY}$ of MCU 106.

In starting circuit 109 having the structure described above, third transistor 109c is on when first or second transistor 109a or 109b is on, and, under this "on" condition, a 5 V voltage output ("S5 V signal") appears. When first and second transistors 109a and 109b are off, third transistor 109c is off and, under this "off" condition, a high impedance output appears.

Since the reset terminal and the standby terminal of MCU 106 are pulled down to the ground when the outputs of reset signal generating circuit 108 and starting circuit 109 are in a high-impedance condition, these terminals are maintained at the low level. Input interface 73a and output interface 73b receive the S5 V signal input from third transistor 109c of starting circuit 109, and start up under this input condition.

MCU 106 operates when the reset terminal is high, i.e., no reset signal output from reset signal generating circuit 108, and the standby signal terminal is high, i.e., no S5 V signal output from starting circuit 109, when the Vcc terminal is supplied with power. When the reset terminal is low, it is reset. When the standby terminal is low, it stops the functions of the internal peripheral modules, and shifts to a hardware standby mode (power-saving mode), where the generator (not shown) for oscillating quartz oscillator 74 shown in FIG. 18 is stopped. Under this condition, although the internal peripheral modules of MCU 106 are reset, the data in RAM 70 is preserved and I/O port 73 of MCU 106 is in the high impedance state as long as the Vcc terminal of MCU 106 is supplied with 5 V. When the S5 V signal from starting circuit 109 is interrupted, input interface 73a and output interface 73b also stop operating, shifting to the power-saving mode, significantly reducing power consumed by air conditioner ECU 68.

When power circuit 107 is supplied with power by battery 75 via battery voltage input terminal 68a, the Vcc terminal of MCU 106 is supplied with 5 V. However, when voltage is applied by battery 75 via battery voltage input terminal 68a only, the third transistor 109c of starting circuit 109 is off. Therefore, since there is no S5 V signal output from starting circuit 109, the signal level of the standby terminal of MCU 106 is set to a low level, maintaining MCU 106 in the hardware standby mode, and input interface 73a and output interface 73b in the power-saving mode. As a result, air conditioner ECU 68 is in the power-saving mode.

Air conditioner ECU 68 is normally in the power-saving mode. However, under the operations or specified conditions below, it initiates operation to function as air conditioner ECU 68.

(1) When the user has turned on ignition switch 76 to drive the electric vehicle A 12 V voltage is applied to input interface 73a and output interface 73b by battery 75 via ignition switch 76, turning select terminal S of input interface 73a and output interface 73b high and thus, shifting interfaces 73a and 73b from the power-saving mode into operation. Also, the 12 V voltage is applied by battery 75 to the base of first transistor 109a in starting circuit 109, turning on first transistor 109a, which in turn energizes third transistor 109c, resulting in a S5 V signal sent from starting circuit 109. As a result, the standby terminal of MCU 106 turns high, inactivating the hardware standby mode of MCU 106. Thus, the power-saving mode of air conditioner ECU 68 as a whole is inactivated. At this moment, reset signal generating circuit 108 sends a reset signal in response to the 12 V supply to start up MCU 106, bringing air conditioner ECU 68 into proper operation.

Figure 21:
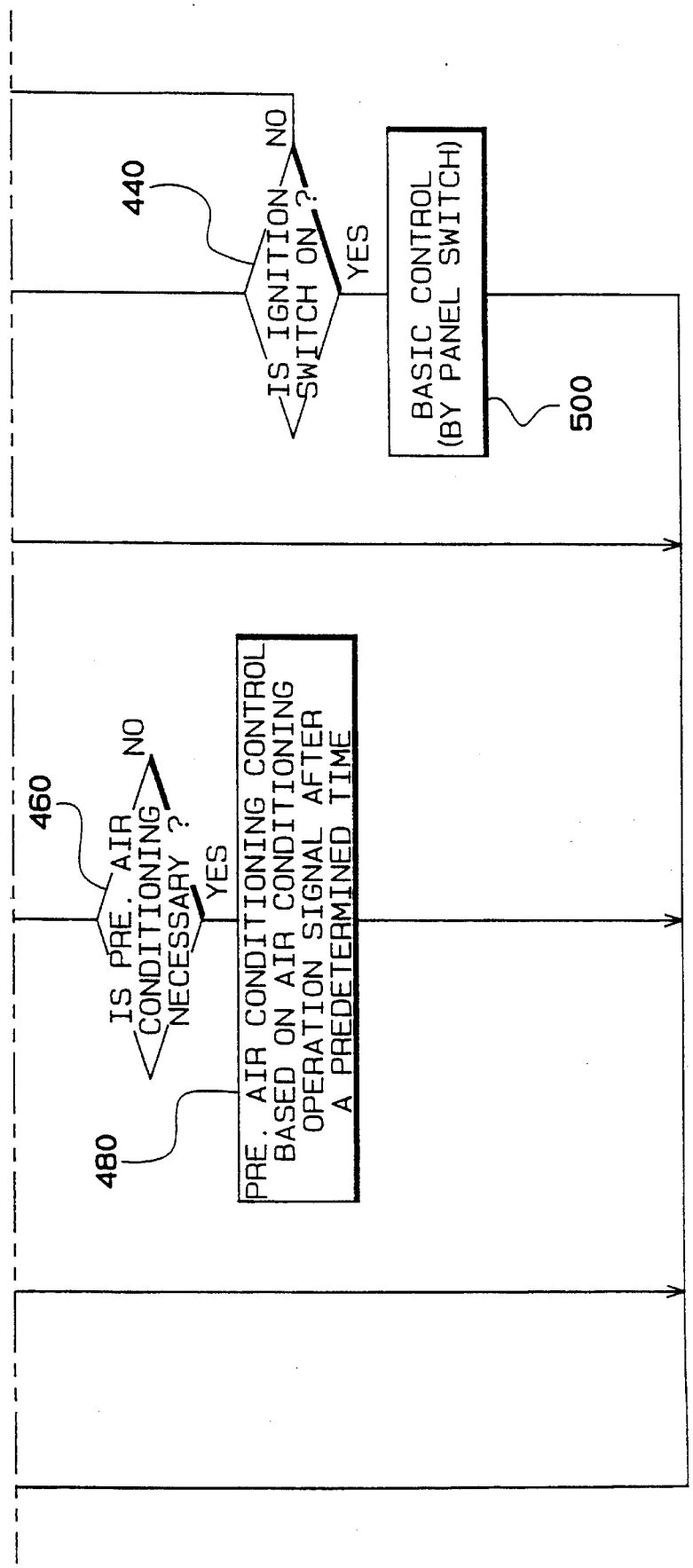
FIG. 21 consists of FIGS. 21A and 21B which together illustrate a flowchart for the operation of the air conditioner ECU.

FIG. 21 is a flowchart showing the operation of MCU 106 on air conditioner ECU 68. In FIG. 21, air conditioner ECU 68 is started when ignition switch 76 is closed as explained earlier. Then, MCU 106 performs initialization in step 400 and starts sensor input, external signal input, and timer counts in step 410. In step 420, MCU 106 judges whether charge switch 104 is on. In step 430, MCU 106 determines whether preliminary air conditioning is necessary. Also, MCU 106 determines whether ignition switch 76 is closed in step 440.

As ignition switch 76 is closed, MCU 106 performs the basic control that has been preset via the controls on air conditioner control panel 83 in step 500.

After a heating operation has continued for a long time under the basic control, exterior heat exchanger 58 is maintained in a cold condition, forming frost on the surface and, thus, impairing the heating ability by the operation of refrigerating cycle 55. Therefore, when frost impairs the heating ability by the operation of refrigerating cycle 55, MCU 106 sets and stores a defrosting necessity flag in RAM 70. RAM 70 preserves the memory even when MCU 106 is in the hardware standby mode.

(2) When the user charges the electric vehicle

During charging, charge control circuit 102 senses charging, and closes charge switch 104, supplying a 12 V voltage to air conditioner ECU 68 via charge switch 104. Thus, the hardware standby mode is inactivated by starting circuit 10, starting the MCU 106 on air conditioner ECU 68, as in the above case where ignition switch 76 is closed.

If charge switch 104 is closed at this point, as shown in the flowchart in FIG. 21, MCU 106 judges whether the defrosting necessity flag is set in step 460 in order to carry out defrosting or preliminary air conditioning as necessary and, if the defrosting necessity flag is set, performs defrosting control under an air conditioning operation permission signal input from charge control circuit 102 in step 470. If the defrosting necessity flag is not set and preliminary air conditioning is necessary in step 430, MCU 106 performs preliminary air conditioning control under an air conditioning operation permission signal input in step 490.

When charging is finished, MCU 106 sends a low level signal through output port P2 after checking to see that charge switch 104 has been opened by charge control circuit, 102 in steps 430 and 440. As a result, second transistor 109b and thus, third transistor 109c, of starting circuit 109 are turned off, switching the standby terminal of MCU 106 to low, thereby shifting MCU 106 to the hardware standby mode, and input interface 73a and output interface 73b to the high impedance condition. As a whole, air conditioner ECU 68 shifts to the power-saving mode.

Figure 22:
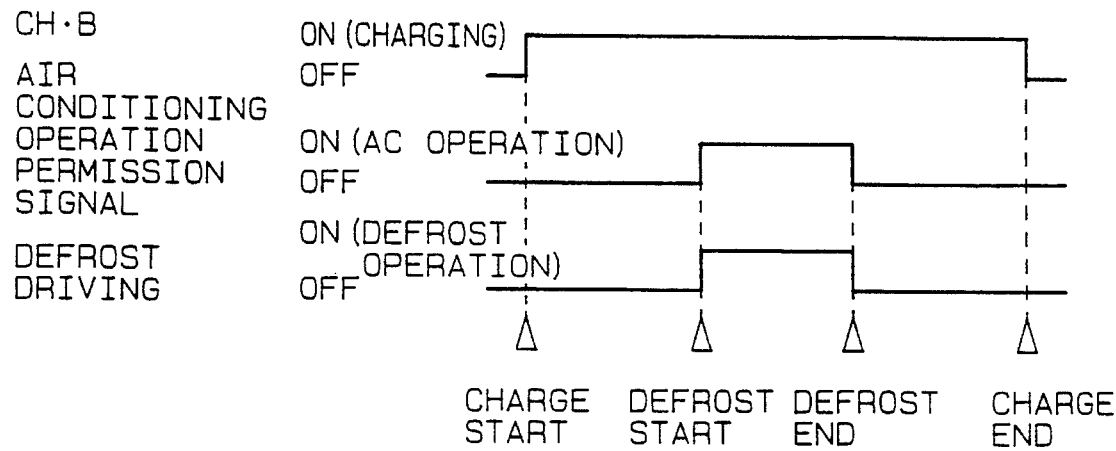
FIG. 22 is a timing chart for the defrosting operation control.

The following explains the defrosting operation in step 470, by referring to the timing chart shown in FIG. 22. If frost has formed as a result of the basic control performed in step 490 of FIG. 21, the defrosting necessity flag is set and stored in RAM 70 even if MCU 106 is in the hardware standby mode. Therefore, MCU 106 begins defrosting control upon starting up as charge switch 104 is closed by charge control circuit 102.

If charge control circuit 102 decides that air conditioning should be allowed, based on the charging current to secondary battery 92, it sends an air conditioner operation permission signal to air conditioner ECU 68. MCU 106 on air conditioner ECU 68, under the air conditioner operation permission signal input, performs defrosting control over air conditioner 20.

After defrosting control as described above is over, MCU 106 resets the defrosting necessity flag. Under this condition, if preliminary air conditioning is unnecessary, steps 420, 450, and 460 in FIG. 21 are repeated while charge switch 104 is closed, i.e., while charging is progressing.

After charging is over, charge control circuit 102 opens charge switch 104. In response to this, air conditioner ECU 68 shifts to the hardware standby mode, bringing air conditioner ECU 68 into the power-saving mode, see FIG. 22, so as to prevent the discharge of battery 75 to supply power to air conditioner ECU 68.

(3) When preliminary air conditioning is carried out during charging

If charging is performed with preliminary air conditioning switch 99 closed, MCU 106 of air conditioner ECU 68 carries out preliminary air conditioning under an air conditioner operation permission signal input from charge control circuit 102, after 9.5 hours from the start of charging. Since charging of an electric vehicle is usually started at 10:00 p.m., when a discounted electric rate begins to apply, 7:30 a.m. (9.5 hours after the start of charging), when the electric vehicle is just about to be used, is the appropriate time to start preliminary air conditioning, assuming, for example, that an electric vehicle is used for commuting.

Figure 23:
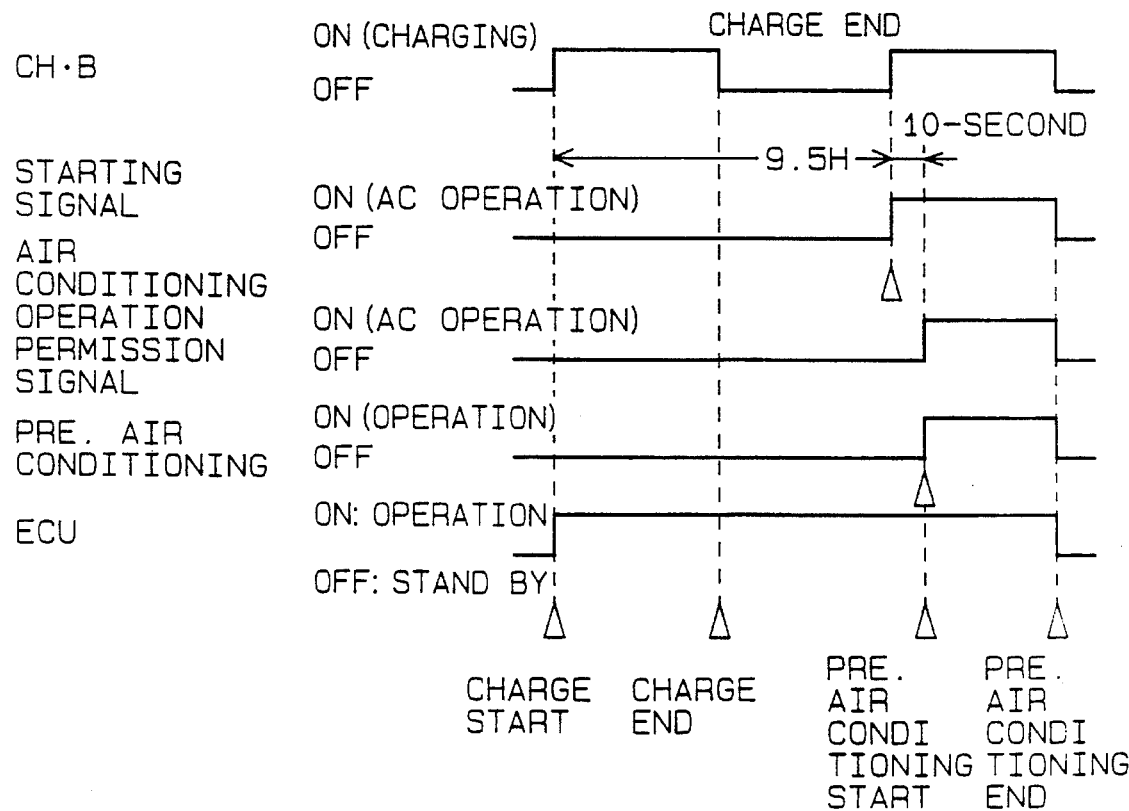
FIG. 23 shows a timing chart for the preliminary air conditioning control.

Air conditioner ECU 68 is started as the electric vehicle is charged see FIG. 23. MCU 106 counts the time from the start of charging for the purpose of preliminary air conditioning.

After charging is over, charge control circuit 102 opens charge switch 104, bringing voltage reducing circuit 105 into the power-saving mode, to prevent discharge from battery 75. However, MCU 106 on air conditioner ECU 68 repeats steps 420, 430, and 490 shown in FIG. 21 in order to count the time from the start of charging for the purpose of preliminary air conditioning control. Therefore, even though CH B is turned off as charging is over, the S5 V signal is sent to maintain P2 high, thus keeping air conditioner ECU 68 in operation.

After 9.5 hours from the start of charging, MCU 106 on air conditioner ECU 68 sends a starting signal to charge control circuit 102, see FIG. 23. Charge control circuit 102, in response to the starting signal, starts operation and closes charge switch 104, Charge control circuit 102 starts charge circuit 93 while zeroing current sensor 103.

When charge switch 104 is closed, the voltage reducing circuit 105 is brought into operation to start charging battery 75. If charge control circuit 102 decides that air conditioning should be allowed, based on the charge current to secondary battery 92, it sends an air conditioner operation permission signal to air conditioner ECU 68. Air conditioner ECU 68, under the air conditioner operation permission signal input, starts preliminary air conditioning, see FIG. 23.

After the preliminary air conditioning, MCU 106 on air conditioner ECU 68 turns off the starting signal output to charge control circuit 102. In response to the starting signal being turned off, charge control circuit 102 opens charge switch 104 and shuts down, stopping voltage reducing circuit 105 to shift to the power-saving mode.

After preliminary air conditioning is over, MCU 68 of air conditioner ECU 106 inactivates the high level signal output from output port P2. Thus, starting circuit 109 is inactivated, stopping the S5 V signal, thereby bringing air conditioning ECU 68 as a whole into the power-saving mode.

If the user has disconnected the charge plug during preliminary air conditioning in order to use the vehicle, the charge control circuit 102 opens charge switch 104, bringing air conditioner ECU 68 as a whole into the power-saving mode, as in the above case where charging is finished.

According to the seventh embodiment, air conditioner ECU 68 shifts to the power-saving mode when control of air conditioner 20 is unnecessary, thus preventing depletion of battery 75, which would be caused by supplying power to air conditioner ECU 68.

The application of the present invention is not limited to the above embodiments. It can be modified or extended as follows:

Instead of separating charge control circuit 102 (charge control means) and air conditioner ECU 68 (air conditioning control means), charge control and air conditioning control may be performed by a single control circuit (control means).

Also, instead of carrying out defrosting or preliminary air conditioning as necessary during charging, either of the defrosting or preliminary air conditioning functions may be eliminated.

This invention has been described in connection with what are presently considered to be the most practical and preferred embodiments of the present invention. However, this invention is not meant to be limited thereto. Rather, this invention is meant to encompass and include all modifications and alternative arrangements included within the spirit and scope of the appended claims.

What is claimed is:

1. An air conditioner control system for electric vehicles for controlling an air conditioner powered by a secondary battery installed in an electric vehicle, said system comprising:

current sensing means for sensing a charging current from an external power supply to said secondary battery; and control means for operating said air conditioner and charging said secondary battery as necessary when said charging current sensed by said current sensing means has dropped to no more than a specified level during charging of said secondary battery wherein said control means includes means for regulating current consumption by said air conditioner so that said current consumption by said air conditioner falls in a range of excess charging current, which does not drop a charging voltage of said secondary battery.

2. An air conditioner control system for electric vehicles according to claim 1, wherein said air conditioner includes an electric compressor and a frequency converter for converting the frequency of current supplied to said electric compressor, wherein said control means includes means for sending a control signal to said frequency converter to control frequency of said current supplied to said electric compressor in order to control said current consumption by said air conditioner.

3. An air conditioner control system for electric vehicles for controlling an air conditioner powered by a secondary battery installed in an electric vehicle, said system comprising:

current sensing means for sensing a charging current from an external power supply to said secondary battery; and control means for operating said air conditioner and charging said secondary battery as necessary when said charging current sensed by said current sensing means has dropped to no more than a specified level during charging of said secondary battery wherein said control means includes means for stopping operation of said air conditioner when current consumption by said air conditioner exceeds a range of excess charging current.

4. An air conditioner control system for electric vehicles according to claim 3, wherein said air conditioner includes an electric compressor and a frequency converter for converting the frequency of current supplied to said electric compressor, wherein said control means includes means for sending a control signal to said frequency converter to control frequency of said current supplied to said electric compressor in order to control said current consumption by said air conditioner.

* * * * *